United States Patent
Namma et al.

(10) Patent No.: US 6,182,116 B1
(45) Date of Patent: Jan. 30, 2001

(54) VIRTUAL WWW SERVER FOR ENABLING A SINGLE DISPLAY SCREEN OF A BROWSER TO BE UTILIZED TO CONCURRENTLY DISPLAY DATA OF A PLURALITY OF FILES WHICH ARE OBTAINED FROM RESPECTIVE SERVERS AND TO SEND COMMANDS TO THESE SERVERS

(75) Inventors: Eimei Namma, Tokyo; Tomomi Kaga, Kawasaki, both of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/152,336

(22) Filed: Sep. 14, 1998

(30) Foreign Application Priority Data

Sep. 12, 1997 (JP) .................................................. 9-248042

(51) Int. Cl.[7] .............................. G06F 13/38; G06F 15/17

(52) U.S. Cl. ......................... 709/204; 709/201; 709/223; 709/224; 709/226; 709/217; 709/227; 709/245; 707/103; 707/104; 707/501

(58) Field of Search ..................................... 709/245, 223, 709/226, 201, 224, 217, 227; 707/103, 104, 501

(56) References Cited

U.S. PATENT DOCUMENTS

| | | | |
|---|---|---|---|
| 5,794,257 | * 8/1998 | Liu et al. ............................... | 707/501 |
| 5,850,352 | * 12/1998 | Moezzi et al. ........................ | 364/514 |
| 5,867,661 | * 2/1999 | Bittinger et al. ...................... | 709/227 |

(List continued on next page.)

FOREIGN PATENT DOCUMENTS

97171378 * 1/1999 (JP) ................................ G06F/13/00

OTHER PUBLICATIONS

Siengh, Web Explorer, PC Magazine, v14, n3, p188–189, 194 (3), Feb. 1995.*
Olsen, Will success spoil web server?, Government Computer News, v14, n10, p43(2), May 1995.*
Goldsborough et al., Two Hottest Internet Suites, PC World, v13, v10, p92(1), Oct. 1995.*
Humpphry, If it's spring, PC Week, v13, n21, p18(1), May 1996.*
Sempson, Counseling on the information highway: Future ..., Journal of Counseling & Development,v75, n3, p203–212(10), Jan. 1997.*

(List continued on next page.)

Primary Examiner—Zarni Maung
Assistant Examiner—Bunjob Jaroenchonwanit
(74) Attorney, Agent, or Firm—Lowe Hauptman Gopstein Gilman & Berner

(57) ABSTRACT

A virtual WWW (World Wide Web) server apparatus which can obtain a plurality of predetermined HTML files and combine these into a single HTML file in response to a specific URL sent from a WWW browser, can connect to WWW servers and the browser via a network such as the Internet, to thereby enable the browser to obtain via the network the contents of a plurality of data files each of which may be HTML files, acquired from respective WWW servers through the intermediary of the virtual WWW server apparatus as a single combined file, and to thereby display the respective file contents together on a single display screen. The virtual WWW server apparatus can further include a linkage file whose contents relate respective names of video cameras controlled by various WWW servers to URLs for sending control commands for these cameras, thereby enabling commands for respective cameras, sent from a browser, to be identified by the corresponding camera names. A plurality of video images from respective cameras can be displayed embedded in respective HTML file contents on a single display screen of a browser, and hence a remote monitoring system or interactive TV system can be easily implemented.

10 Claims, 19 Drawing Sheets

U.S. PATENT DOCUMENTS

| | | | | |
|---|---|---|---|---|
| 5,870,559 | * | 2/1999 | Leshem et al. | 709/224 |
| 5,878,218 | * | 3/1999 | Maddalozzo et al. | 709/213 |
| 5,887,139 | * | 3/1999 | Madison, Jr. et al. | 709/223 |
| 5,890,171 | * | 3/1999 | Blumer et al. | 707/501 |
| 5,894,554 | * | 4/1999 | Lowery et al. | 709/203 |
| 5,897,644 | * | 4/1999 | Nielsen | 707/513 |
| 5,898,830 | * | 4/1999 | Wesinger, Jr. et al. | 395/187.01 |
| 5,917,997 | * | 6/1999 | Bell et al. | 395/182.02 |
| 5,923,854 | * | 7/1999 | Bell et al. | 709/243 |
| 5,926,179 | * | 7/1999 | Matsuda et al. | 345/355 |
| 5,933,596 | * | 8/1999 | Mayhew | 709/203 |
| 5,945,993 | * | 8/1999 | Fleischmann | 345/339 |
| 5,954,798 | * | 9/1999 | Shelton et al. | 709/224 |
| 5,956,038 | * | 9/1999 | Rekimoto | 345/419 |
| 5,961,594 | * | 10/1999 | Bouvier et al. | 709/223 |
| 5,983,262 | * | 11/1999 | Kukkal | 709/204 |
| 5,991,798 | * | 11/1999 | Ozaki et al. | 709/217 |
| 5,999,944 | * | 12/1999 | Lipkin | 707/104 |
| 6,003,065 | * | 12/1999 | Yan et al. | 709/201 |
| 6,006,260 | * | 12/1999 | Barrick, Jr. et al. | 709/224 |
| 6,006,264 | * | 11/1999 | Colby et al. | 709/226 |
| 6,009,429 | * | 12/1999 | Greer et al. | 707/10 |
| 6,026,433 | * | 2/2000 | D'Arlach et al. | 709/217 |
| 6,032,162 | * | 2/2000 | Burke | 707/501 |
| 6,038,598 | * | 4/2000 | Danneels | 709/219 |
| 6,052,730 | * | 4/2000 | Felciano et al. | 709/225 |
| 6,058,425 | * | 5/2000 | White | 709/227 |
| 6,061,695 | * | 5/2000 | Silka et al. | 707/513 |

OTHER PUBLICATIONS

Mace, Web graphic tools, PC Magazine, v16, n5, p141(11), Mar. 1997.*

Snell, GoLive Cyberstudio, MacUser, v13, n5, p26(2), May 1997.*

Karp, IE 4.0 secrets., Windows Sources, v5, n7, p182(4), Jul. 1997.*

* cited by examiner

```
<HTML>
<HEAD>
<TITLE>      WWW Server Home Page </TITLE>
</HEAD>

<BODY>
<H1>
WELCOME TO THE WWW SERVER
</H1>

<P>
<URL="http://wwwA/index.html">
<URL="http://wwwB/index.html">
</BODY>
</HTML>
``` http://www/index.html

FIG. 6

```
<HTML>
<HEAD>
<TITLE> WWW Server A Home Page <TITLE>
</HEAD>

<BODY>
<H1>
WELCOME TO WWW SERVER A
</H1>

<P>
<FORM METHOD=post ACTION="regname.cgi">
What is your name ?
<INPUT NAME="username" TYPE=TEXT SIZE="20"><BR>
<INPUT TYPE=SUBMIT VALUE="register">
</FORM>
</BODY>
</HTML>
``` http://wwwA/index.html

FIG. 7

```
<HTML>
<HEAD>
<TITLE> WWW Server B Home Page <TITLE>
</HEAD>

<BODY>
<H1>
WELCOME TO WWW SERVER B
</H1>

<P>
<FORM METHOD=post ACTION="username.cgi">
What is your name ?
<INPUT NAME="username" TYPE=TEXT SIZE="20"><BR>
<INPUT TYPE=SUBMIT VALUE="input">
</FORM>
</BODY>
</HTML>
``` http://wwwB/index.html

FIG. 8

[WWWServerHomePage]

☐ ☐ ☐ ☐

URL : http:// www/index.html

Welcome to the WWW Server

Welcome to WWW Server A

What is your name ? [        ]

[REGISTER]

Welcome to WWW Server B

Please input your name [        ]

[INPUT]

FIG. 10

```
<HTML>
<HEAD>
<TITLE> Thomson Residence Home Page </TITLE>
</HEAD>

<BODY>
<H1>
WELCOME TO THE THOMSON RESIDENCE
</H1>

<P>
<EMBED SRC="http:/www/camera.vew">
</BODY>
</HTML>
``` http://www/index.html

FIG. 11

| camera1 | http:/wwwA/camera.vew |
|---------|------------------------|
| camera2 | http:/wwwB/camera.vew |

FIG. 17 PRIOR ART

```
<HTML>
<HEAD>
<TITLE> WWW Server A Home Page <TITLE>
</HEAD>

<BODY>
<H1>
Welcome to the WWW server A
</H1>

<P>
<IMG SRC="image.gif">
<HR>
<A HREF="http://wwwB/index.html">
Link to WWW server B
</A>
</BODY>
<HTML>
```
http://wwwA/index.html

FIG. 18 PRIOR ART

```
<HTML>
<HEAD>
<TITLE> WWW Server B Home Page <TITLE>
</HEAD>

<BODY>
<H1>
Welcome to the WWW server B
</H1>

<P>
<IMG SRC="image.gif">
<HR>
<A HREF="http://wwwA/index.html">
Link to WWW server B
</A>
</BODY>
</HTML>
```
http://wwwB/index.html

VIRTUAL WWW SERVER FOR ENABLING A SINGLE DISPLAY SCREEN OF A BROWSER TO BE UTILIZED TO CONCURRENTLY DISPLAY DATA OF A PLURALITY OF FILES WHICH ARE OBTAINED FROM RESPECTIVE SERVERS AND TO SEND COMMANDS TO THESE SERVERS

BACKGROUND OF THE INVENTION

1. Field of Application

The present invention relates to a method of inter-server cooperation which utilizes the HTTP protocol, for communication between WWW servers and WWW browsers which are mutually connected via a data communication network such as the Internet.

2. Description of Prior Art

In recent years, with the increasing popularity of utilizing the Internet for information exchange via the WWW (World Wide Web), various ways of transferring information by using WWW servers and WWW browsers (i.e., servers and browsers designed to be compatible with WWW communication) have been developed.

A WWW server may store and handle various types of information expressed as HTML (HyperText Markup Language) files, or video data files, etc., while a WWW browser can use the URL (Uniform Resource Locator) specifying a desired file and the location (i.e., directory path within a specific server) where the file is held, to transfer HTML files or image data files from the WWW server to the browser via the Internet by employing the HTTP (HyperText Transfer Protocol). The WWW browser can then translate the file into suitable form for displaying the file contents, i.e., as a page of text, or a still or moving image. A large number of WWW servers are mutually connected via the Internet, for interchange of data.

A user of a WWW browser can send a request for accessing a file stored at a specific WWW server by directly inputting the URL of that file, or achieving the same result by activating (i.e., "clicking on") a corresponding hypertext link appearing in a displayed page of HTML data. The WWW browser responds by finding the IP (Internet Protocol) address of the server corresponding to the specified URL, and sending the request (e.g, in the form of a GET command) to the address of the WWW server, via the Internet. The required file is then obtained through a communication link which is established via the Internet by the destination server and is maintained until the data transfer has been completed.

The above basic features will be described using the example of two WWW servers and a WWW browser which are shown in FIG. 16. Here, numeral 10 denotes a first WWW server, which includes an HTTP communication section 101 for executing communication with WWW browsers via the Internet, a request processing section 102 for translating received URLs, a data acquisition section 103 for acquiring and outputting HTML or image data, etc, in accordance with the specified URLs, and a stored set of files 10001 which may include HTML files, still picture or video image data files, etc. For simplicity of description, only the transfer of HTML files will be described for this example. A second WWW server, designated by numeral 20, has the same configuration as the WWW server 10. A WWW browser 30 includes a URL input section 301 for inputting URLs by a user, and a URL analysis section 302 for obtaining IP (Internet Protocol) addresses of WWW servers corresponding to URLs. The WWW browser 30 further includes a HTTP communication section 303 which executes communication with WWW servers via the Internet, a HTTP analysis section 304 for determining how the contents of a received file are to be displayed (after performing any necessary data conversion processing, such as translation from HTML to a text format in the case of an HTML file), and a display section 305 for displaying the contents of received files.

It will be assumed for example that a user inputs "HTTP://wwwA/index.html" from the URL input section 301, as a URL. The URL input section 301 transfers that input URL to the HTTP communication section 303. The first field of the URL specifies the name of the server to which connection is to be made for obtaining the requested file "index.html". In this example, "wwwA" is the server name of the virtual WWW server apparatus 10. The URL analysis section 302 extracts this first field, and transfers the server name together with a GET command to the HTTP communication section 303. The GET command is generated by omitting the first field of the URL, i.e. as: "GET/index.html". From the server name, the HTTP communication section 303 acquires the corresponding IP address, to establish a connection to the HTTP communication section 101 of the server having that IP address, and passes the GET command to that HTTP communication section 101. The HTTP communication section 101 then passes the received GET command to the request processing section 102. The request processing section 102 extracts the portion "index.html" (i.e., the name of the requested file) from the GET command, and passes this to the data acquisition section 103. The data acquisition section 103 is capable of finding the directory path to the stored file "index.html", and reads out that file and sends the file contents to the HTTP communication section 101.

FIG. 17 shows an example of an HTML file which is held at the virtual WWW server apparatus 10, which will be assumed to be the requested file, and which in this example is the "home page" of the virtual WWW server apparatus 10. The HTTP communication section 101 transfers the contents of this file to the HTTP communication section 303 of the WWW browser 30, and then breaks the connection to the WWW browser 30. The HTTP communication section 303 of the WWW browser 30 then passes the contents of that received HTML file to the HTTP analysis section 304, which analyzes the file, and notifies the display section 305 of how the file contents are to be displayed. The display section 305 then displays the file contents, i.e., as a page of text containing a static image, in this example.

FIG. 19 shows an example of how the HTML file of FIG. 17 might be displayed by the display section 305. In this example, a hypertext link can be established to the WWW server B, as indicated by the underlining of the displayed portion "To WWW Server B" in FIG. 19. If the user uses an input device to select that display portion, e.g., by "clicking" on that portion by using a mouse, then information can be obtained from the link destination, i.e. the WWW server B. Specifically, the URL of a file corresponding to the hypertext link is passed to the URL analysis section 302, and the processing described above is executed to obtain the file from the WWW server B 20, i.e., the HTTP communication section 303 executes connection to the WWW server B 20, and receives the contents of an HTML file from the WWW server B 20. FIG. 18 shows an example of such an HTML file, whose contents constitute the home page of the WWW server B 20. When the WWW browser 30 receives this HTML file, the display contents change from the form shown in FIG. 19 to that shown in FIG. 20.

However in general, it is not possible to display information from a plurality of WWW servers on a single display screen of a WWW browser. The only exception is that it is possible to obtain and display the contents of a HTML file obtained from one WWW server while at the same time displaying an image which has been obtained as an image data file from a different server, i.e. an image data file whose URL is specified within the obtained HTML file. However it is not possible to also concurrently obtain and display the contents of an HTML file from such another server.

Furthermore, in addition to the usual manner of using a WWW server as described above, it is also possible for a WWW browser user to send a request to a WWW server for execution of some operation other than "read out and send this file". Such a request can be sent in the same way as a file transfer request, i.e. by inputting a URL. In that case, inputting the URL to a WWW browser has the effect of sending to a WWW server a command to execute a specific program, for a purpose such as control of the operation of some device, and to return any data generated as a result of that execution.

Apart from the case of performing HTTP communication between a WWW browser and a WWW server, it is possible to achieve display of information from a plurality of servers on a single display screen by using some form of special communication protocol or program (such as UDP or TCP), a plug-in, etc. However if it is required to access communication with these servers via the Internet by using a WWW browser which is located within a corporation, then since such communication is generally executed via a firewall, it would be difficult to overcome the above problem by using such a special in-house communication arrangement.

It should be understood that the term "browser" as used herein refers to a program which is run on the computer of a user, so that for example a phrase such as "the picture displayed by the browsers in the following description and claims actually signifies "the picture which is being presented, by operation of a browser, on the display screen of the corresponding computer system". It should similarly be understood that the term "server" as used herein refers to a program which is run on a computer system, rather than to that computer system itself.

SUMMARY OF THE INVENTION

For the above reasons, it is an objective of the present invention to enable information obtained from a plurality of WWW servers to be displayed on a single display screen of a usual type of WWW browser, i.e., with the WWW servers and at least one WWW browser being connected to a communication network utilizing the HTTP communication protocol such as the Internet, and to enable commands to be issued to these WWW servers by utilizing that single display screen while HTTP communication between the browser and the WWW servers is in progress. That objective is basically achieved by providing a virtual WWW server apparatus, which is connected to the communication network in the same manner as an actual WWW server, and which functions in accordance with the HTTP in an essentially similar manner to an actual WWW server, but which serves an intermediary between a WWW browser and a predetermined plurality of actual WWW servers. The virtual WWW server apparatus holds a stored HTML generating procedure file which may for example contain the URLs of respective HTML files which are stored at these WWW servers. In that case, when a WWW browser user uses the URL of that HTML generating procedure file to send to the virtual WWW server apparatus a request specifying the HTML generating procedure file, the virtual WWW server apparatus reads out the contents of that HTML generating procedure file, uses the URLs listed therein to successively obtain the contents of the respective files from the WWW servers via the Internet, and combines these file contents with information contained in the HTML generating procedure file to thereby produce a generated HTML file. The virtual WWW server apparatus then sends that HTML file via the Internet to the requesting WWW browser. When that WWW browser now handles that received generated HTML file in the same manner as any other received HTML file, the respective contents of the plurality of HTML files obtained from the plurality of actual WWW servers will be displayed concurrently on a single display screen by the WWW browser. The user can thereby view these contents, and use any hyperlinks contained therein to send requests for file dispatch, etc., to the actual WWW servers.

Basically, such a virtual WWW server apparatus holds a HTML generating procedure file which contains information necessary for obtaining respective HTML files from a predetermined plurality of actual WWW servers via the Internet, and includes means which responds to a request sent from a WWW browser specifying that HTML generating procedure file by:

(a) reading out the HTML generating procedure file and analyzing its contents, to obtain the location information for the HTML files, (b) using that location information to successively obtain these HTML files via the network, using the HTTP protocol, (c) combining information contained in the generating procedure file and the received HTML file contents to produce a generated HTML file, and (d) sending that generated HTML file via the network to the requesting WWW browser, using the HTTP.

More specifically according to that first aspect the present invention provides, in a data communication system having at least one WWW browser which is connected via a data communication network to a plurality of WWW servers, a virtual WWW server apparatus comprising HTTP communication means for executing communication between the virtual WWW server apparatus and the WWW browser via said network, a stored HTML generating procedure file containing procedure information for use in generating a HTML file and also containing information expressing respective locations of a predetermined set of HTML files held at respective ones of said WWW servers, request processing means for detecting when a file transfer request which specifies said HTML generating procedure file is received by said HTTP communication means, data acquisition means for executing HTTP communication with other ones of said plurality of WWW servers via said network, and HTML generating means for responding to said detection by said request processing means of a file transfer request by reading out said HTML generating procedure file to obtain information specifying each of said locations of the predetermined set of HTML files, successively supplying information specifying said locations to said data acquisition means to thereby obtain said HTML files from said WWW servers by HTTP transfer via said network, combining respective contents of said HTML files with said procedure information contained in said HTML generating procedure file to produce a generated HTML file, and supplying said generated HTML file to said HTTP communication means to be transferred to said WWW browser via said network.

With a second aspect of the present invention, one or more of the plurality of HTML files obtained from the plurality of actual WWW servers may be a FORM file, i.e,, a HTML file containing information delimited by FORM tags. When such a file is received from a WWW server by a WWW browser and analyzed, the WWW browser is caused to display a message requesting that an information item (such as a telephone number, name, etc.) be input by the browser user. When that information item is input to the WWW browser, it is automatically sent back to the WWW server which originated the FORM file, and processed by a program such as a CGI (Common Gateway Interface) program which is specified in the FORM information. The virtual WWW server apparatus of this embodiment includes means for analyzing the contents of each HTML file obtained from the plurality of actual WWW servers to detect whether it is a FORM file and, if so, for attaching to the FORM contents an identifier for the WWW server which originated that FORM file. Subsequently, when an input information item is sent back (with the identifier attached thereto) to the virtual WWW server apparatus from the WWW browser in response to the FORM contents, the virtual WWW server apparatus uses the identifier to send that input information item (with the information specifying the corresponding CGI program) to the originating WWW server.

Basically, such a virtual WWW server apparatus holds a HTML generating procedure file which contains information necessary for obtaining respective HTML files from a predetermined plurality of actual WWW servers via the Internet, and includes means for responding to a request sent by HTTP from a WWW browser, specifying that HTML generating procedure file, by:

(a) reading out the HTML generating procedure file and analyzing its contents, to obtain the location information for the HTML files, (b) using that location information to successively obtain these HTML files via the network, using the HTTP protocol, (c) analyzing each of the received HTML files, to detect any file which is a FORM file, (d) for each FORM file, attaching to the FORM information an identifier which specifies the WWW server that originated the FORM file, (d) using the generation procedure file contents and the received HTML file contents to produce a generated HTML file, (e) sending that generated HTML file via the network to the requesting WWW browser, using the HTTP, and (f) for each set of information which is sent back from said WWW browser in response to a FORM file, using said attached identifier to send said set of information to the WWW server corresponding to said identifier, by HTTP.

More specifically according to the second aspect the present invention provides, in a data communication system having at least one WWW browser which is connected via a data communication network to a plurality of actual WWW servers, a virtual WWW server apparatus comprising HTTP communication means for executing communication between the virtual WWW server apparatus and the WWW browser via said network, a stored HTML generating procedure file containing procedure information for use in generating a HTML file and also containing information expressing respective locations of a predetermined set of HTML files held at respective ones of said actual WWW servers, request processing means for respectively detecting when a file transfer request which specifies said HTML generating procedure file or when a set of information sent in response to a FORM HTML file is received by said HTTP communication means, data acquisition means for executing HTTP communication with said predetermined set of actual WWW servers via said network, HTML generating means for responding to said detection by said request processing means of a file transfer request by reading out said HTML generating procedure file to obtain information specifying each of said locations of the predetermined set of HTML files, successively supplying information specifying said locations to said data acquisition means to thereby obtain said HTML files from said actual WWW servers by HTTP transfer via said network, analyzing each of said obtained HTML files to detect the presence of FORM HTML files, attaching to FORM information contained in each detected FORM HTML file an identifier indicative of a one of said plurality of actual WWW servers which originated said FORM HTML file, combining respective contents of said HTML files with said procedure information contained in said HTML generating procedure file to produce a generated HTML file, and supplying said generated HTML file to said HTTP communication means to be transferred to said WWW browser via said network, and interface processing means for receiving each said set of information sent from said WWW browser in response to a FORM HTML file and detected by said request processing means , for using said identifier to control said data acquisition means to send said set of information to said originating one of the plurality of WWW servers, by HTTP via said network.

According to a third aspect, a virtual WWW server apparatus according to the present invention can be utilized in conjunction with a WWW browser, and a plurality of WWW servers each provided with a video camera connected to supply video data thereto, to enable a user of the WWW browser to selectively display images which are generated by the respective video cameras, i.e. a remote monitoring system can be very easily implemented, using a network such as the Internet for data transfer. This is achieved, essentially by the following:

(1) Providing, in a generated HTML file which is produced by the virtual WWW server apparatus based on the HTML generating procedure file contents, picture embedding information which when received by a WWW browser will cause that WWW browser to activate an appropriate plug-in program for controlling the browser to enable display of a plurality of video images and to respond appropriately to a user request for display of video data from one of the video cameras, and for handling data acquisition operations relating to such requests, with that picture embedding information also specifying (as a URL) the virtual WWW server apparatus as the source of video data.

(2) Providing in the virtual WWW server apparatus a linkage file which relates each video camera name to location information (i.e., a URL.) for use in sending to the corresponding WWW server a command for starting the transfer of video data from that video camera to the virtual WWW server apparatus, via the network, with the video data then being transferred by the virtual WWW server apparatus to the WWW browser.

In that way, when the plug-in has been activated, the WWW browser user need only specify a video camera name, to request acquisition of a corresponding video image. The plug-in then generates a command which is sent to the virtual WWW server apparatus together with the specified video camera name. The virtual WWW server apparatus then obtains the URL corresponding to that video camera name, and uses that URL to set up an Internet connection to acquire the the necessary video data.

It thereby becomes possible to use, for example, a single HTML EMBED tag with its SRC attribute to enable selective display of a plurality of video images from respective video cameras on a single display screen of a WWW browser, under the control of a single plug-in.

More specifically according to the third aspect the present invention provides, in a data communication system having at least one WWW browser which is connected via a data communication network to a plurality of actual WWW servers which respectively include a video camera and video camera operation means for controlling the supplying of video data generated by said video camera to said network, a virtual WWW server apparatus comprising HTTP communication means for executing communication between the virtual WWW server apparatus and the WWW browser via said network, a stored HTML generating procedure file containing procedure information for use in generating a HTML file and also containing picture embedding information for causing said WWW browser to activate a predetermined plug-in program for controlling said WWW browser to selectively display a plurality of video images from respective ones of said video cameras in response to respective input requests which specify said video camera names, with said picture embedding information identifying said virtual WWW server apparatus as a source of video data for use in generating each of said video images, a stored camera name linkage file containing information relating respective video camera names to corresponding locations of said video camera operation means of said WWW servers, request processing means for respectively detecting when a file transfer request which specifies said HTML generating procedure file or a video data transfer request which specifies one of said video camera names is received by said HTTP communication means from said WWW browser, data acquisition means for executing communication with said plurality of WWW servers via said network, HTML generating means for responding to said detection by said request processing means of a file transfer request by reading out said HTML generating procedure file contents and using said contents to produce a generated HTML file containing said picture embedding information, and supplying said generated HTML file to said HTTP communication means to be transferred to said WWW browser via said network, and camera control means for receiving from said request processing means a video camera name which is received with a request for video data transfer, reading out the contents of said linkage file to obtain a location of said video camera operation means corresponding to said video camera name, sending to said video camera operation means via said data acquisition means and said network a request for transfer of video data from a video camera corresponding to said video camera name via said network to said data acquisition means, and transferring said video data from said data acquisition means to said HTTP communication means, to be transferred via said network to said WWW browser.

According to a fourth aspect, a virtual WWW server apparatus according to the present invention can be utilized in conjunction with at least a first computer system having a first WWW browser and a first WWW server which is equipped with a video camera and a second computer system having a second WWW browser and a second WWW server which is also equipped with a video camera, to enable interactive TV communication between the users of these WWW browsers via a data communication network. In particular this enables either of these users, when desiring to initiate interaction with another user under a condition in which the WWW browser of that other user is not activated, to send a request for activation of that WWW browser of the other user. The other user can thereby easily be notified, by the browser activation, of the desire for interaction.

This is achieved, essentially by:

(1) providing in the HTML generating procedure file that is stored by the virtual WWW server apparatus, information which (when the generated HTML file produced by the virtual WWW server apparatus is received and analyzed by a WWW browser) will enable the WWW browser to obtain an appropriate plug-in program which has been designed for interactive TV display operation, and to activate that plug-in. The user of that WWW browser can then input a request to initiate TV interaction with another user, by sending such a request to the virtual WWW server apparatus, specifying a camera name corresponding to that other user, (2) providing in the virtual WWW server apparatus a linkage file which relates each video camera name to location information (i.e., a URL) for use in sending to the corresponding WWW server a request for starting the transfer of video data derived from the output of that video camera to the virtual WWW server apparatus, via the network, with the video data then being transferred by the virtual WWW server apparatus to the requesting WWW browser, and also virtual WWW server apparatus browser activation designation means for sending to that corresponding WWW server a request for activation of the corresponding WWW browser, and (3) arranging that when operation of a WWW browser is thereby activated, the WWW browser then activates a plug-in for use in interactive TV operation.

In that way, when the plug-in of a WWW browser of a first computer system has been activated, the WWW browser user need only specify a video camera name, to activate the WWW browser of a second computer system (if that browser is not currently activated), and also start to receive and display video data from the video camera of that second computer system.

In addition, such a system may be configured such that the WWW browser of the second computer system responds to being activated in that manner by automatically sending to the virtual WWW server apparatus a request for transfer of video data from the video camera of the first computer system. Thus, when the second WWW browser is activated in that way, it begins to display a video image from the video camera of the system which has initiated the activation.

More specifically according to the fourth aspect the present invention provides, in a data communication system having a data communication network and a plurality of computer systems each having a WWW browser and an WWW server, with the WWW server of each said computer system including browser activation means operable for activating the corresponding WWW browser, with each of said WWW servers including a video camera and video camera operation means for controlling the supplying of video data generated by said video camera to said network, a virtual WWW server apparatus comprising HTTP communication means for executing communication between the virtual WWW server apparatus and each of said WWW browsers via said network, a stored HTML generating procedure file containing procedure information for use in generating a HTML file and also containing picture embedding information for causing a WWW browser to activate a predetermined plug-in program for controlling said WWW browser to selectively display a plurality of video images from respective ones of said video cameras in response to respective input requests which specify said video camera names, with said picture embedding information identifying said virtual WWW server apparatus as a source of video data for use in generating each of said video images, a stored camera name linkage file containing information relating respective video camera names, to corresponding locations of said video camera operation means of said WWW servers, request processing means for respectively detecting when a file transfer request which specifies said HTML generating procedure file or which specifies a name of a video camera located at the WWW server of a second one of said computer systems is received by said HTTP communication means from a first one of said WWW browsers, data acquisition means for executing communication with said WWW servers via said network, HTML generating means for responding to said detection by said request processing means of a file transfer request from said first one of said WWW browsers by reading out said HTML generating procedure file, using the contents of said HTML generating procedure file to produce a generated HTML file containing said plug-in acquisition information, and supplying said generated HTML file to said HTTP communication means to be transferred to said first WWW browser via said network, camera control means for receiving from said request processing means said video camera name, reading out the contents of said linkage file to obtain a location of said video camera operation means corresponding to said video camera name, sending to said video camera operation means of the WWW server of said second computer system, via said data acquisition means and said network, a request for transfer of video data from a video camera corresponding to said video camera name via said network to said data acquisition means and transferring said video data from said data acquisition means to said HTTP communication means, to be transferred via said network to said first WWW browser, and browser activation designation means controlled by said camera control means for sending a browser activation request to said browser activation means of the second computer system via said data acquisition means and said network, said second WWW browser being controlled by said browser activation means to be activated thereby and to send to said virtual WWW server apparatus a file transfer request specifying said HTML generating procedure file, to thereby obtain from said virtual WWW server apparatus said picture embedding information and to activate said plug-in program.

Furthermore, said virtual WWW server apparatus may comprise means for determining the network address of said first computer system, for obtaining from said linkage file the name of said video camera of said first computer system as a video camera name corresponding to said network address, and sending said video camera name to said to said second WWW server to be thereby supplied to said second WWW browser when said second WWW browser has been activated, while said second WWW browser may comprise means functioning, following said activation of said second WWW browser, to automatically send to said virtual WWW server apparatus a request to receive video data from said video camera of said first computer system, with said request specifying said video camera name which is supplied from said second WWW server.

According to a fifth aspect, a virtual WWW server apparatus according to the present invention can be utilized in conjunction with a plurality of computer systems each having WWW browser and a WWW server which is equipped with a video camera, to enable interactive TV communication between the users of these WWW browsers via a data communication network. In particular this enables any of these users, when desiring to enter into an interactive TV session which is already in progress between the respective computer systems of two or more other users, to do so simply by executing a simple input operation to obtain and activate the necessary plug-in program, and activating that user's video camera if it is not currently activated.

This is achieved, essentially by:

(1) providing in the HTML generating procedure file that is stored by the virtual WWW server apparatus, picture embedding information which (when a resultant generated HTML file produced by the virtual WWW server apparatus is received and analyzed by a WWW browser) will cause the WWW browser to activate an appropriate plug-in program which has been designed for controlling interactive TV operation, (2) providing in the virtual WWW server apparatus a linkage file which relates each video camera name to location information (i.e., a URL) for use in sending to the corresponding WWW server a request for starting the transfer of video data from that video camera to the virtual WWW server apparatus, via the network, with the video data then being transferred by the virtual WWW server apparatus to the requesting WWW browser, and means for establishing respective connections via the network to all of the WWW servers whose video camera names are registered in the linkage file, when a request is received from any of the computer systems to initiate an interactive TV connection to another one the computer systems.

(3) configuring each of the WWW servers with means for monitoring the activation status of the corresponding video camera, and means which can respond to a request from the virtual WWW server apparatus for transfer of video data, by generating and returning a message indicative of an inactive status, if the video camera is not activated when that request is received, and (4) providing in the virtual WWW server apparatus means for receiving each such message, and for maintaining the corresponding network connection between that WWW server and the virtual WWW server apparatus unchanged, until the corresponding video camera is activated and can then begin sending video data to the virtual WWW server apparatus via that connection.

More specifically according to the fifth aspect the present invention provides, in a data communication system having a data communication network and a plurality of computer systems each having a WWW browser and a WWW server, with the WWW server of each said computer system including a video camera, video camera operation means for controlling the supplying of video data generated by said video camera to said network, means for monitoring the operation of said video camera and means controllable for sending via said network a message indicative of an inactive status of said video camera, a virtual WWW server apparatus comprising HTTP communication means for executing communication between the virtual WWW server apparatus and each of said WWW browsers via said network, a stored HTML generating procedure file containing procedure information for use in generating a HTML file and also containing picture embedding information for causing a WWW browser to activate a suitable plug-in program for controlling TV interaction operation, a stored camera name linkage file containing information relating respective video camera names to corresponding locations of said video camera operation means of said WWW servers, request processing means for respectively detecting when a file transfer request which specifies said HTML generating procedure file or a video data transfer request which specifies a name of a video camera located at the WWW server of a second one of said computer systems is received by said HTTP communication means from a first one of said WWW browsers, data acquisition means for executing communication with said WWW servers via said network, HTML generating means for responding to said detection by said request processing means of a file transfer request from said first one of said WWW browsers by reading out said HTML generating procedure file contents and using said contents to produce a generated HTML file containing said picture embedding information, and supplying said generated HTML file to said HTTP communication means to be transferred to said first WWW browser via said network, camera control means for receiving from said request processing means said request for video data transfer and said video camera name and, if no interactive communication is currently in progress between any of said computer systems, reading out the contents of said linkage file to obtain a location of said video camera operation means corresponding to said video camera name, sending to said video camera operation means of the WWW server of said second computer system, via said data acquisition means and said network, a request for establishment of a connection via said data acquisition means and said network for transfer of video data from a video camera corresponding to said video camera name, and transferring said video data from said data acquisition means to said HTTP communication means, to be transferred via said network to said first WWW browser, overall video data receiving means functioning, if interactive communication is currently in progress between a plurality of said computer systems when said request for video data transfer and said video data name are received, to obtain from said linkage file the respective locations of said video camera operation means of all of said plurality of computer systems other than said second computer system, and for sending to each of said video camera operation means respective requests for transfer of video data from a corresponding one of said video cameras and establishment of a connection via said network and said data acquisition means for transfer of said video data, wherein said overall video data receiving means responds to a message from said notification means of any of said WWW servers indicating that a video camera is currently inactivated, by holding a corresponding connection via said network to said WWW server in an unchanged condition until said video camera is activated and video data therefrom can be transferred to said virtual WWW server apparatus via said connection.

BRIEF DESCRIPTION OF THE DRAWINGS

FIG. 6 shows an example of a FORM HTML file which is stored at a first WWW server;

FIG. 7 shows an example of a FORM HTML file which is stored at a second WWW server;

FIG. 8 shows an example of a display picture produced by a WWW browser in response to a generated HTML file supplied by the virtual WWW server apparatus embodiment of FIG. 5, containing the contents of the FORM files of FIGS. 6 and 7;

FIG. 10 shows an example of the contents of a HTML generating procedure file stored in the virtual WWW server apparatus of FIG. 9, for use in producing a generated HTML file which contains location information for a plug-in program to be used by a WWW browser when receiving video data from a plurality of WWW servers, transferred from the virtual WWW server apparatus;

FIG. 11 shows an example of the contents of a linkage file which is stored in the virtual WWW server apparatus of FIG. 9, for relating respective predetermined video camera names to URLs which are utilized to send control commands to the corresponding video cameras;

FIG. 17 shows an example of the contents of a HTML file which is stored at a first WWW server shown in FIG. 16;

FIG. 18 shows an example of the contents of a HTML file which is stored at a second WWW server shown in FIG. 16;

DESCRIPTION OF PREFERRED EMBODIMENTS

Figure 1:
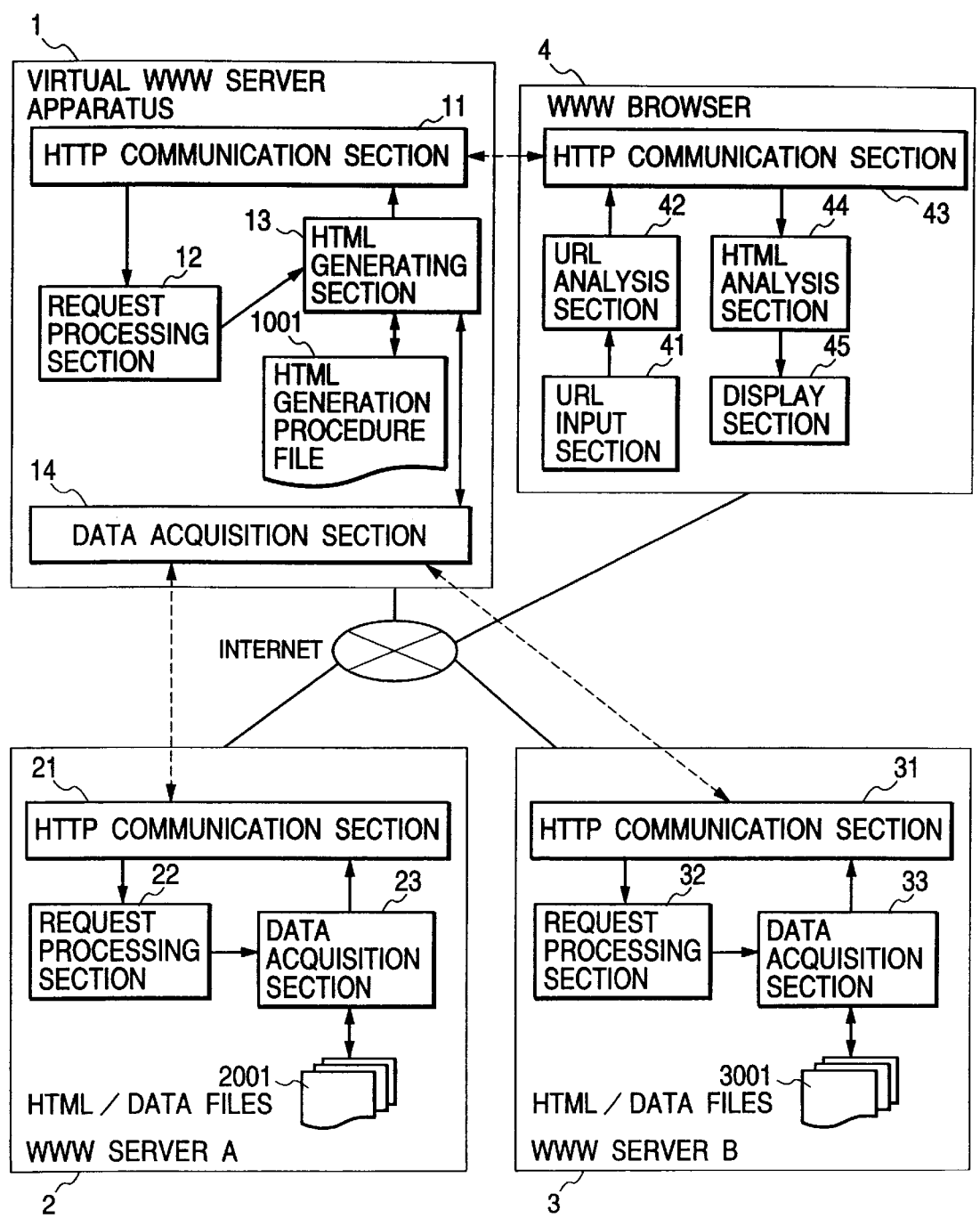
FIG. 1 is a general system block diagram showing a first embodiment of a virtual WWW server apparatus coupled for data communication via the Internet, to enable respective HTML files stored at a plurality of actual WWW servers to be displayed together on a single display screen by a WWW browser.

In the following, embodiments of the present invention will be described referring to the drawings. It should be noted that the present invention is not limited to the configurations of these described embodiments, and that various other configurations could be envisaged, which fall within the scope claimed for the present invention.

First Embodiment

FIG. 1 is a general system block diagram showing a data communication system in which a virtual WWW server apparatus according to the present invention can connect via the Internet to at least one WWW browser and to a plurality of WWW servers (i.e., actual WWW servers), with one WWW browser and two WWW servers being shown in this example. It should be noted that in the following description and in the appended claims, the term "WWW server" signifies a conventional type of WWW server, as opposed to a virtual WWW server apparatus according to the present invention. In FIG. 1, the virtual WWW server apparatus 1 includes a HTTP communication section 11 for executing HTTP communication via the Internet and a request processing section 12 for processing a file transfer command when such a command, directed to the IP (Internet Protocol) address of the HTTP communication section 1, has been received by the HTTP communication section 11. The HTTP communication section 1 further includes a stored HTML generating procedure file 1001, a HTML data generating section 13 for reading out the contents of the HTML generating procedure file 1001 when required, and for using the file contents to produce a generated HTML file, and a data acquisition section 14 for executing communication with WWW servers and for receiving data from such WWW servers. Numeral 2 denotes a first WWW server, numeral 3 denotes a second WWW server, and 4 denotes a WWW browser. The HTTP communication section 1, WWW server A 2 and WWW server B 3 can be respectively identical to the WWW servers 10, 20 and WWW browser 30 of the prior art example of FIG. 16 described above.

The URL of the HTML generating procedure file 1001 which is stored at the HTTP communication section 1 can be input by a user in the same way as for the URL of a file stored at an actual server such as the WWW server A 2 or WWW server B 3. It will be assumed that the URL of the HTML generating procedure file 1001 held at the HTTP communication section 1 is "HTTP://www/index.html", i.e., the name of the HTML generating procedure file is "index.html". When that URL is input by the user of the WWW browser 4, a GET command which requests the HTML generating procedure file 1001 and specifies the ID address of the HTTP communication section 1 is transferred from the HTTP communication section 43 to the HTTP communication section 11 via the Internet, and a connection is established between the HTTP communication section 43 of the WWW browser 4 and the HTTP communication section 11 of the HTTP communication section 1 in the same way as for the connection of the HTTP communication sections of the virtual WWW server apparatus 10 and WWW browser 30 of the prior art example of FIG. 16. The HTTP communication section 11 passes the received GET command to the request processing section 12, which then extracts from the command the name of the file which is being requested, i.e., "index.html", and passes that file name to the HTML data generating section 13. When the HTML data generating section 13 is passed that name, this constitutes a request for the HTML data generating section 13 to read out and analyze the contents of the HTML generating procedure file 1001.

Figures 3, 4:
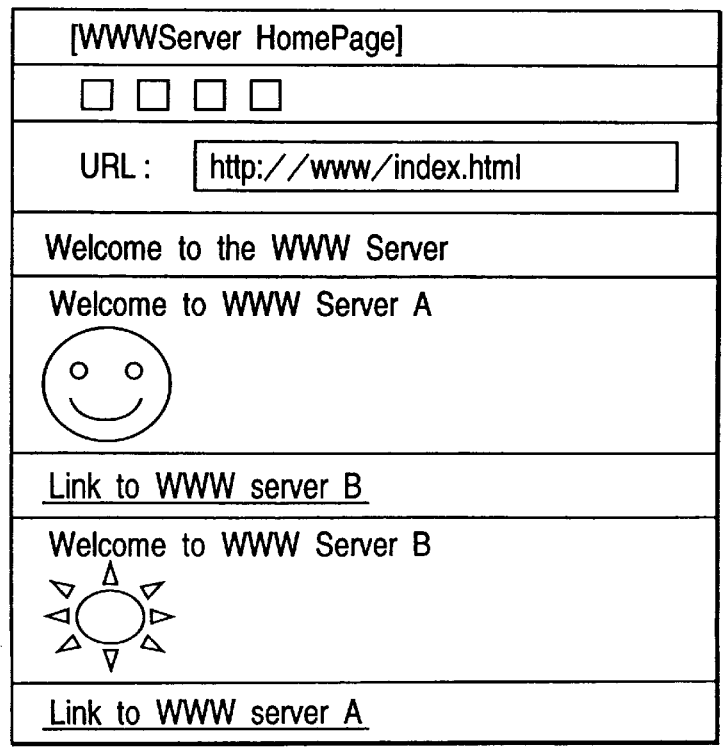
FIG. 3 shows an example of the contents of a HTML generating procedure file stored in the virtual WWW server apparatus of FIG. 1, for use in producing a generated HTML file which combines information from the HTML generating procedure file with respective information of HTML files obtained from a plurality of WWW servers.
FIG. 4 shows an example of a display picture which would be generated by a WWW browser in response to a such a generated HTML file.

FIG. 3 shows an example of the contents of the HTML generating procedure file 1001. As can be seen such an HTML generating procedure file is written as a sequence of tags which are basically in accordance with the present standards for HTML, but with the addition of one new tag, i.e. the "URL" tag. Each "URL" tag indicates a command which is used to acquire an HTML file from a specific WWW server, as described in the following.

Figure 2:
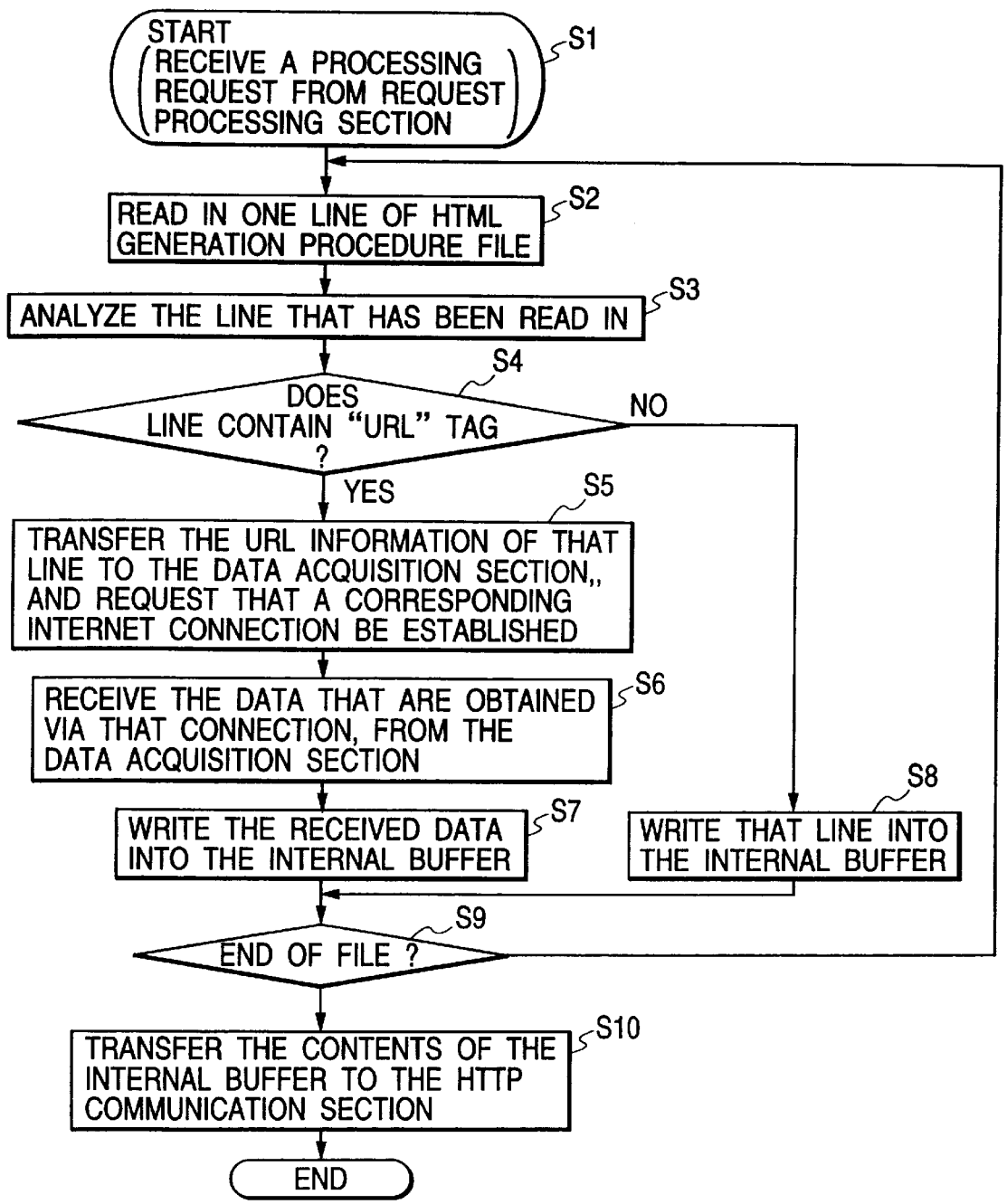
FIG. 2 is a flow diagram illustrating the operation of an HTML generating section in the virtual WWW server apparatus embodiment of FIG. 1.

The processing operation of the HTML data generating section 13 will be described referring to the corresponding flow diagram of FIG. 2, in conjunction with the HTML generating procedure file example of FIG. 3. In step S1 of FIG. 2, a request for analysis of the file "index.html", i.e., of the contents of the HTML generating procedure file 1001, is received by the HTML data generating section 13 from the request processing section 12, and in step S2 the first line of that file is read in by the HTML data generating section 13. In step S3, that first line is analyzed, and the first tag is found. In this example it is assumed that the first tag is "HTML". In step S4, this tag is compared with the string "URL", and if they are found to be mutually identical, operation proceeds to step S5. If not, operation jumps to step S8. In the example of FIG. 3, since the first line is not identical to "URL", step S8 is then executed, in which that first line is stored in an internal buffer of the HTML data generating section 13, i.e. an internal buffer which is dedicated to holding HTML data. Next, in step S9, a decision is made as to whether the final line of the file has been read. If so, then operation proceeds to step S10, while if the final line has not yet been reached, operation returns to step S2. The above operations are repeatedly executed until the line <URL="HTTP://wwwA/index.html"> is reached. Since the tag of that line is "URL", step S5 is then executed, in which that URL (i.e. "HTTP://wwwA/index.html") is passed to the data acquisition section 14. The data acquisition section 14 then finds the IP address specified by that URL, and connects to the corresponding www server (i.e., in this case, the WWW server 2, having the name WWWA), and obtains the contents of the specified file (in this case, the file named "index.html" which is stored at the virtual WWW server apparatus 10). In step S6 the HTML data generating section 13 receives that file from the data acquisition section 14, and in step S7 the file contents are stored in the internal buffer of the HTML data generating section 13. Operation then proceeds to step S9, to judge if the final line of the HTML generating procedure file has been reached. If not, operation returns to step S3, to analyze the next line of the HTML generating procedure file, which in this case specifies the URL of a file stored at the WWW server B 20. The contents of that file are then obtained and stored in the internal buffer of the HTML data generating section 13 in the same manner as for the file from the virtual WWW server apparatus 10.

Such operations are repeated until the final line of the HTML generating procedure file is detected in step S9, whereupon in step S10 the contents of the internal buffer of the HTML data generating section 13 are passed to the HTTP communication section 11, thereby completing the processing sequence executed by the HTML data generating section 13.

It can thus be understood that a single HTML file has thereby been generated by the HTML data generating section 13, by combining data contained in the HTML generating procedure file 1001 with the contents of of the two files respectively obtained from two WWW servers, with these two files having been obtained as specified by other data contained in the HTML generating procedure file 1001, and that this HTML file has been generated in response to a file transfer request from a WWW browser, specifying the URL of the HTML generating procedure file 1001.

Ths single HTML file which has thereby been produced by the HTML data generating section 13 is then supplied to the HTTP communication section 11, to be transferred via the Internet to the HTTP communication section 43 of the WWW browser 4. That is to say, once the generated HTML file has been produced by the HTML data generating section 13 it is then handled in the same manner as a file whose transfer has been requested, using the file URL, from a usual type of WWW server. After processing by the HTML analysis section 44, the contents of the received HTML file are displayed by the display section 45. FIG. 4 shows an example of the resultant display image contents. As shown, the contents of the "home page" portion of the HTML generating procedure file 1001 stored at the virtual WWW server apparatus 1 (i.e., the first eight lines of the file "HTTP://www/index.html" in FIG. 3) are displayed, together with those of the two files which were obtained from the WWW server A 2 and the WWW server B 3, with these three sets of file contents being presented on a single display screen of the WWW browser 4.

Figure 16:
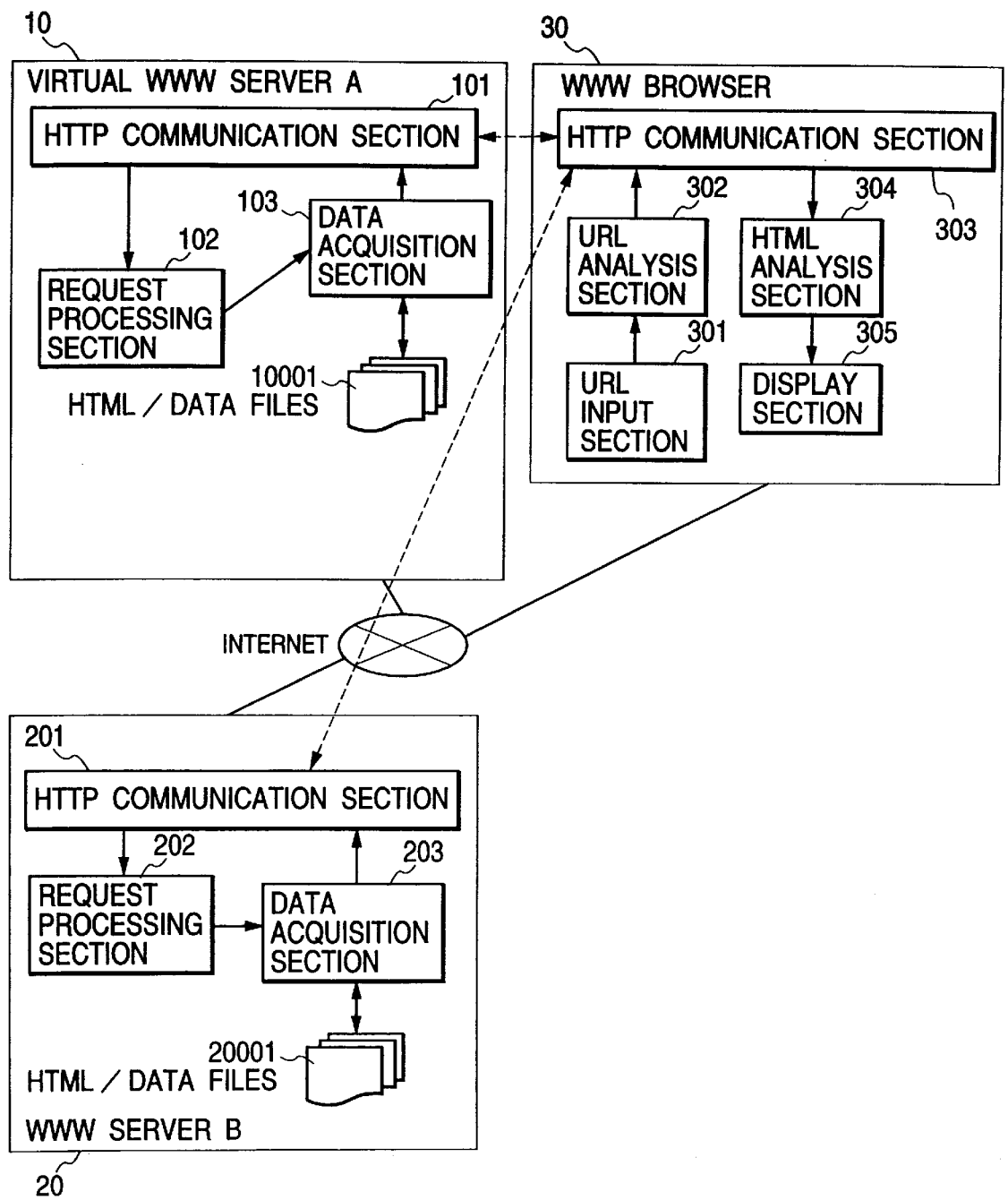
FIG. 16 is a general system block diagram illustrating a prior art system for enabling HTML files stored at respective WWW servers to be supplied to a WWW browser via the Internet.
Figure 19:
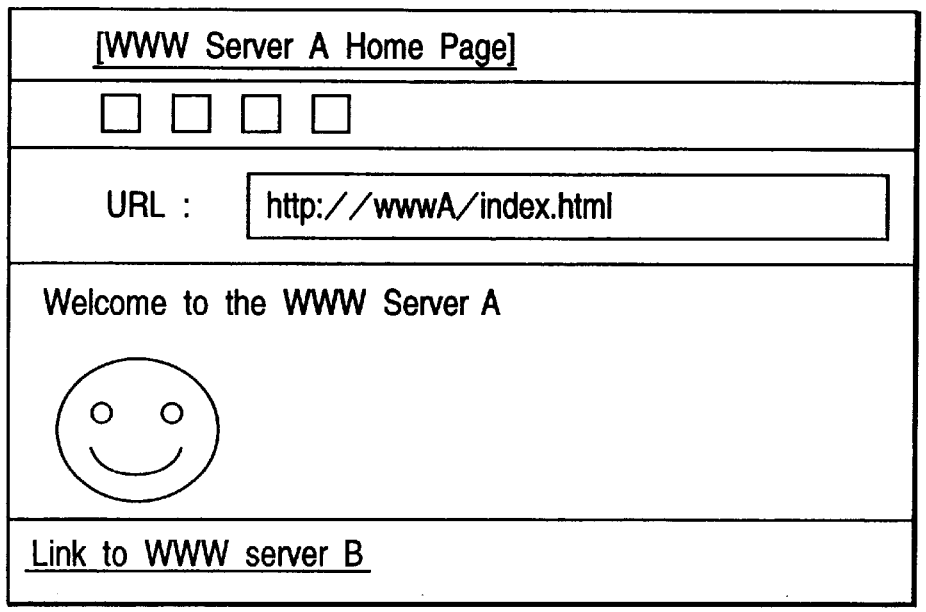
FIG. 19 shows an example of a display picture which would be generated by a WWW browser in response to the HTML file of FIG. 17.
Figure 20:
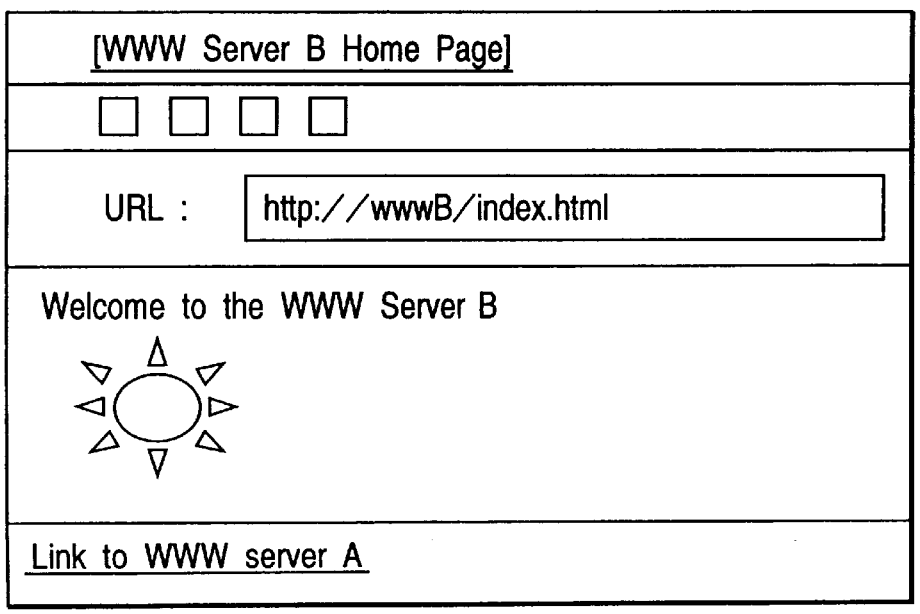
FIG. 20 shows an example of a display picture which would be generated by a WWW browser in response to the HTML file of FIG. 18.

The examples of files stored at the WWW servers 2 and 3 are the same as those used in describing the prior art example of FIG. 16.

As can be understood by the above, with this embodiment of the invention, it becomes possible to present the contents of respective HTML data files from a plurality of WWW servers concurrently on a single display screen of a WWW browser, by using a usual form of HTTP communication via a network such as the Internet, while using usual types of WWW server and WWW browser without modification. Hence, the invention has great practical value.

In the above, for simplicity of description, it has been assumed that with the first embodiment of the invention the virtual WWW server apparatus 1 is implemented on a computer system which is separate from each of the computer systems on which the WWW servers 2 and 3 are respectively implemented. However in practice it would of course be possible to implement the virtual WWW server apparatus 1 on the same computer system as that of the WWW server 2 or the WWW server 3.

Furthermore, although with the above description of the embodiment the contents of the HTML generating procedure file 1001 are assumed to specify that specific HTML files are to be obtained from respective WWW servers, it would be equally possible to configure the contents of the HTML generating procedure file of the virtual WWW server apparatus to include commands for designating that specific programs (such as a CGI or Servelet type of program) are to be activated at specified WWW servers. In that case, when the HTML data generating section 13 reads out the contents of the HTML generating procedure file and finds the tag for such a command, it would cause that command to be sent to the specified WWW server, to thereby activate the designated program. It will be apparent that such a function can be easily provided by the embodiment of FIG. 1, and that such a function will enable a user of a WWW browser to send specific operating commands such as program activation commands simultaneously to a plurality of predetermined WWW servers, simply by inputting the URL of the HTML generating procedure file 1001.

Hence, this embodiment of the present invention not only enables respective HTML files from a plurality of WWW servers to be concurrently displayed on a single display screen by a WWW browser, but also enables a browser user to issue operating commands to a predetermined plurality of WWW servers by performing a single input operation at a WWW browser.

Second Embodiment

An HTML file can include FORM information, i.e. information enclosed between initial and final FORM tags, and such a file will be referred to in the following as a FORM file. The FORM information includes the name of an input value which is to be obtained from a user of a browser which receives the FORM file, and the name of a program such as a CGI program which is to be executed to process the input value when that value is sent back to the WWW server which issued the FORM file. When such a file is received by a WWW browser, the browser displays a request for the user to supply the input value, then sends the input value (e.g., expressing the user's home address or telephone number) back to the originating WWW server together with a command for processing that input value by using the program which is specified in the FORM information.

Figure 5:
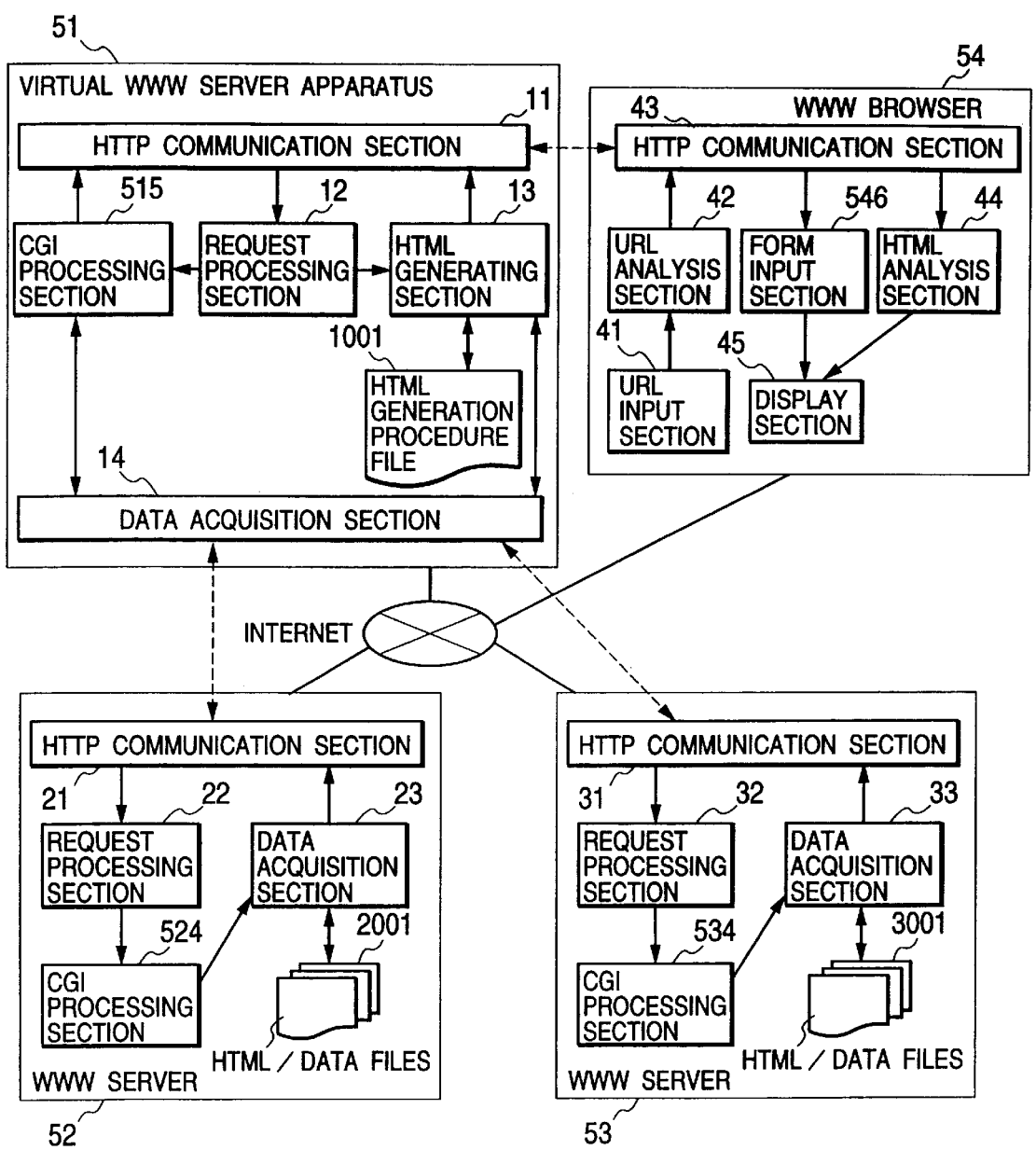
FIG. 5 is a general system block diagram showing a second embodiment of a virtual WWW server apparatus coupled for data communication via the Internet, to enable respective HTML files stored at a plurality of actual WWW servers, which may include FORM files, to be displayed together on a single display screen by a WWW browser, and to enable information that is input by a WWW browser user in response to displayed FORM file contents to be correctly transferred to the originating WWW server.

The second embodiment of the invention will be described referring to the contents of FIG. 5. This operation enables satisfactory operation when FORM files must be handled by the virtual WWW server apparatus. In FIG. 5, numerals 52, 53 respectively denote a WWW server A and WWW server B. having the server names wwwA, wwwB respectively, while numeral 51 denotes a virtual WWW server apparatus and numeral 54 denotes a WWW browser. The WWW servers 52, 53 store respective HTML data files which can be obtained by the virtual WWW server apparatus 51 in a similar manner to that described for the first embodiment, with at least some of these files being FORM files. It will be assumed that the contents of one such FORM file stored at the WWW server A 52 are as shown in FIG. 6, while those of a file stored at the WWW server B 53 are as shown in FIG. 7. Similarly to the first embodiment, these HTML file file examples constitute the respective home pages of the WWW servers 52, 53. In each of the FORM files of FIGS. 6, 7, the ACTION tag in the FORM information specifies the name of a program which is to be executed by the originating WWW server to process the specified input value called "username". If such files containing FORM information were received by the virtual WWW server apparatus 1 of the first embodiment of the present invention shown in FIG. 1, from the WWW servers 2 and 3 of that embodiment, so that the contents of FIG. 6 and FIG. 7 were received and displayed by a usual type of WWW browser such as the WWW browser 4 of FIG. 1, then the resultant display picture would be be as shown in FIG. 8. In that case if the user enters his or her name in one of the "name" windows and actuates the corresponding "input" or "registration" button on the display, a command containing the name of the CGI program that is specified in the FORM file together with the input value for "name" would be passed from the WWW browser 4 to the HTTP communication section 1, by HTTP protocol.

Since the command contents do not contain information specifying the WWW server which is to execute the CGI program whose name is passed at that time to the virtual WWW server apparatus together with the input value, i.e. the program name "regname.cgi" or "username.cgi", it would not be possible for the virtual WWW server apparatus to determine the WWW server to which that command is actually to be directed. It can thus be understood that it would not be possible to directly use the first embodiment of the present invention under a condition in which FORM files may be obtained by the virtual WWW server apparatus as part of the plurality of HTML files which are sent to the WWW browser from the virtual WWW server apparatus.

However with the second embodiment of the present invention, that problem is avoided. Specifically, it is made possible for the virtual WWW server apparatus to determine which of respective WWW servers is to receive an operating command (e.g., specifying activation of a particular CGI program) that is sent back from a WWW browser to the virtual WWW server apparatus WWW server as a response to a FORM file.

As a result, with the second embodiment of the invention shown in FIG. 5, FORM pages from a plurality of WWW servers can be displayed at a WWW browser concurrently on a single display screen, with operating commands resulting from user input being transferred to the appropriate ones of these WWW servers, to be executed.

In FIG. 5, the virtual WWW server apparatus A 51 contains a CGI processing section 515 whose function is to judge which of the WWW servers is to receive an operating command requesting activation of a CGI program, which has been sent back from the WWW browser 54 in response to a FORM file. The WWW server A 52 includes a CGI processing section 524, for executing a CGI program specified by such an operating command, while the WWW server B 53 similarly includes a CGI processing section 534. The WWW browser 54 includes a FORM input section 546, which processes input values which are supplied by the browser user in reply to FORM information displayed by the display section 45. It will be assumed that with this embodiment, the FORM input section 546 generates a GET command containing such an input value, as described in the following.

The remaining portions of the embodiment of FIG. 5 are identical to those of the first embodiment of FIG. 1 described above.

In the same way as described for the embodiment of FIG. 1, when the user of the WWW browser 54 inputs the URL of the HTML generating procedure file 1001, so that the request processing section 12 of the virtual WWW server apparatus 51 detects that a request for that file has been sent, the HTML data generating section 13 responds by reading out the HTML generating procedure file 1001 and analyzing the contents, and thereby obtains from the WWW server A 52 and WWW server B 53 respective HTML files whose URLs are listed within the HTML generating procedure file 1001. However instead of simply inserting the contents of each of these obtained files into the HTML file which is to be generated and sent to the WWW browser 54 as described for the first embodiment, the HTML data generating section 13 first analyzes the contents of each of the files obtained from the WWW server A 52 and WWW server B 53 to detect the presence of any FORM tags. That is to say, when the HTML file shown in FIG. 6 is received from the WWW server A 52, the HTML data generating section 13 successively checks the lines of that file until the line headed by the initial FORM tag is found. When that line is detected, the HTML data generating section 13 modifies its contents by adding information for identifying the server which originated that FORM file. Thus in the case of the FORM file shown in FIG. 6, since the originating server is named wwwA, the line:

<FORM METHOD=post ACTION="regname.cgi"> would be changed to:

<FORM METHOD=post ACTION="/wwwA/regname.cgi">

The resultant modified FORM file is inserted into the HTML file which is being generated by the HTML data generating section 13, and the same operation is then performed for the FORM file which is obtained from the WWW server B 53, with the server identification information in this case being "/wwwB/".

When the HTML file thus generated by the HTML data generating section 13 is completed, it is sent via the HTTP communication section 11 to the WWW browser 54. When that generated HTML file is received by the WWW browser 54, the resultant display which is generated at the WWW browser 54 will be as shown in FIG. 8. It can thus be understood that this embodiment enables FORM information from FORM HTML files respectively held at a plurality of WWW servers to be presented on a single display screen of a WWW browser.

In this example, each of the FORM files requires that the browser user supplies his or her name as the input value to be sent back to the originating WWW server. When a user of the WWW browser 54 types a name value into one of the name windows of the displayed picture shown in FIG. 8, and then activates the corresponding one of the registration buttons (i.e. which are respectively labelled as "registration" and "input"), the FORM input section 546 of the WWW browser 54 uses the ACTION portion of the corresponding FORM information (i.e. "ACTION="/wwwA/regname.cgi") and the "username" value which has been input by the user, to generate a GET command in the HTTP protocol which includes the name of the WWW server which originated the corresponding FORM file, such as:

"GET/wwwA/regname.cgi?username=John Jones"

That command is then passed by the WWW browser 54 and virtual WWW server apparatus 51 via the Internet to the virtual WWW server apparatus 51. The request processing section 12 examines each input command which is received by the request processing section 12, and recognizes that this is not an HTML file acquisition request, and so passes the command to the CGI processing section 515. The CGI processing section 515 then obtains the name of the WWW server to which the GET command contents are to be sent, from the header field of the command. In this case, the the name wwwA of the WWW server A 52 is obtained. When that WWW server name has been obtained, the CGI processing section 515 deletes the header field (/wwwA) of the modified GET command, then passes the WWW server name that has been obtained, to the data acquisition section 14, together with a value expressing the GET command with the header field removed, i.e. passes the value:

"GET/regname.cgi?username=John Jones"

The data acquisition section 14 then establishes a connection to the WWW server A 52 and sends that GET command to the WWW server A 52. In response, the CGI processing section 524 of the WWW server A 52 executes the cgi program "regname.cgi" to process the input value which has been sent from the browser, and returns a result. That result is then sent via the HTTP communication section 21 of the WWW server A 52 to the data acquisition section 14 of the virtual WWW server apparatus 51, which passes the result to the CGI processing section 515. The CGI processing section 515 then transfers the result via the HTTP communication section 11 to the WWW browser 54, and the result (such as information confirming that the input value has been correctly received by the originating WWW servers) is then displayed by the WWW browser 54.

A similar sequence of operations occurs if the user inputs a FORM response which is directed to the WWW server B 53.

Figure 21:
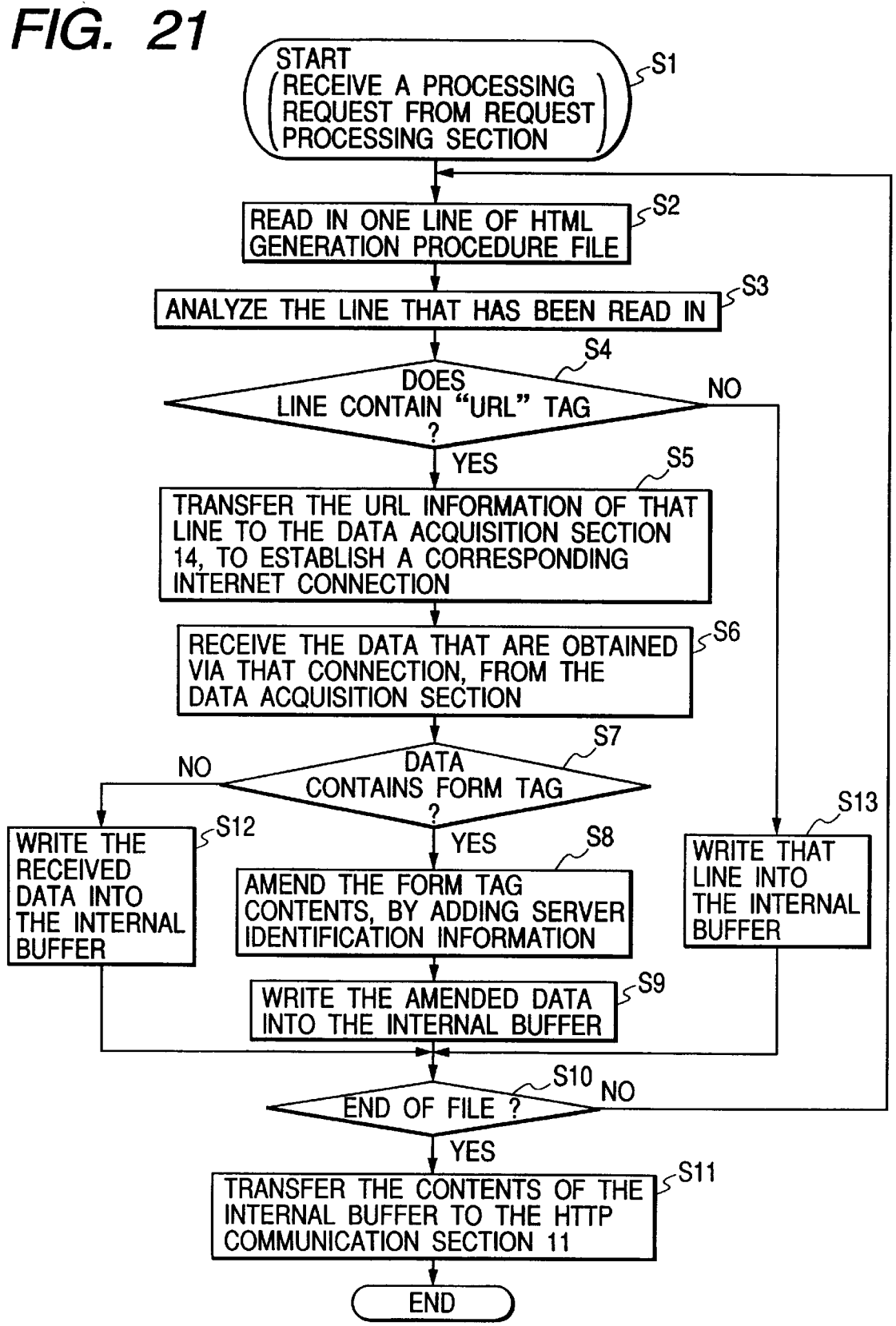
FIG. 21 is a flow diagram illustrating the operation of an HTML generating section in the second virtual WWW server apparatus embodiment, shown in FIG. 5.

The successive operations executed by the HTML generating section of this embodiment are shown in the flow diagram of FIG. 21, which illustrates how each line of a received HTML file is examined to determine whether the line contains URL or FORM information, with server identification information being added in step S8 if the line is found to begin with a FORM tag.

As can be understood from the above, with this embodiment of the present invention, when FORM HTML files are to be obtained from the respective ones of the plurality of WWW servers and combined with contents of the HTML generation procedure file 1001 to form a single generated HTML file which is sent to the WWW browser 54, operation commands and input values sent from the WWW browser in response to the resultant plurality of sets of displayed FORM information will be correctly allocated to the appropriate WWW servers, while a single display screen can be utilized for displaying the FORM information and for input operations. Hence the practical value of this embodiment is substantial.

Third Embodiment

It is possible to specify, within an HTML file, that the displayed file contents are to include an embedded video image. This is done by including in the HTML file a tag whose contents specify picture embedding information, including information specifying a source of video data for producing the video image (e.g., as the URL of such a source). For example, the HTML EMBED tag, followed by the SRC attribute which specifies the video data source, may be used for that purpose. When a WWW browser receives an analyzes such a HTML file, it responds by activating a corresponding control program, for (a) handling a stream of video data which is acquired for producing the video image, when necessary, (b) enabling a user to request display of the video image (i.e., by generating a corresponding icon which can be "clicked on" by the user to make such a request), and (c) responding to such a request by sending to the specified video data source a command for acquiring the video data.

Such a control program can be stored locally at the WWW browser, i.e. as a plug-in, or may be a "helper" program which is located separately from the WWW browser, however for simplicity of description, the term "plug-in" is used in the following description and the appended claims as a general term for such a control program.

Figure 9:
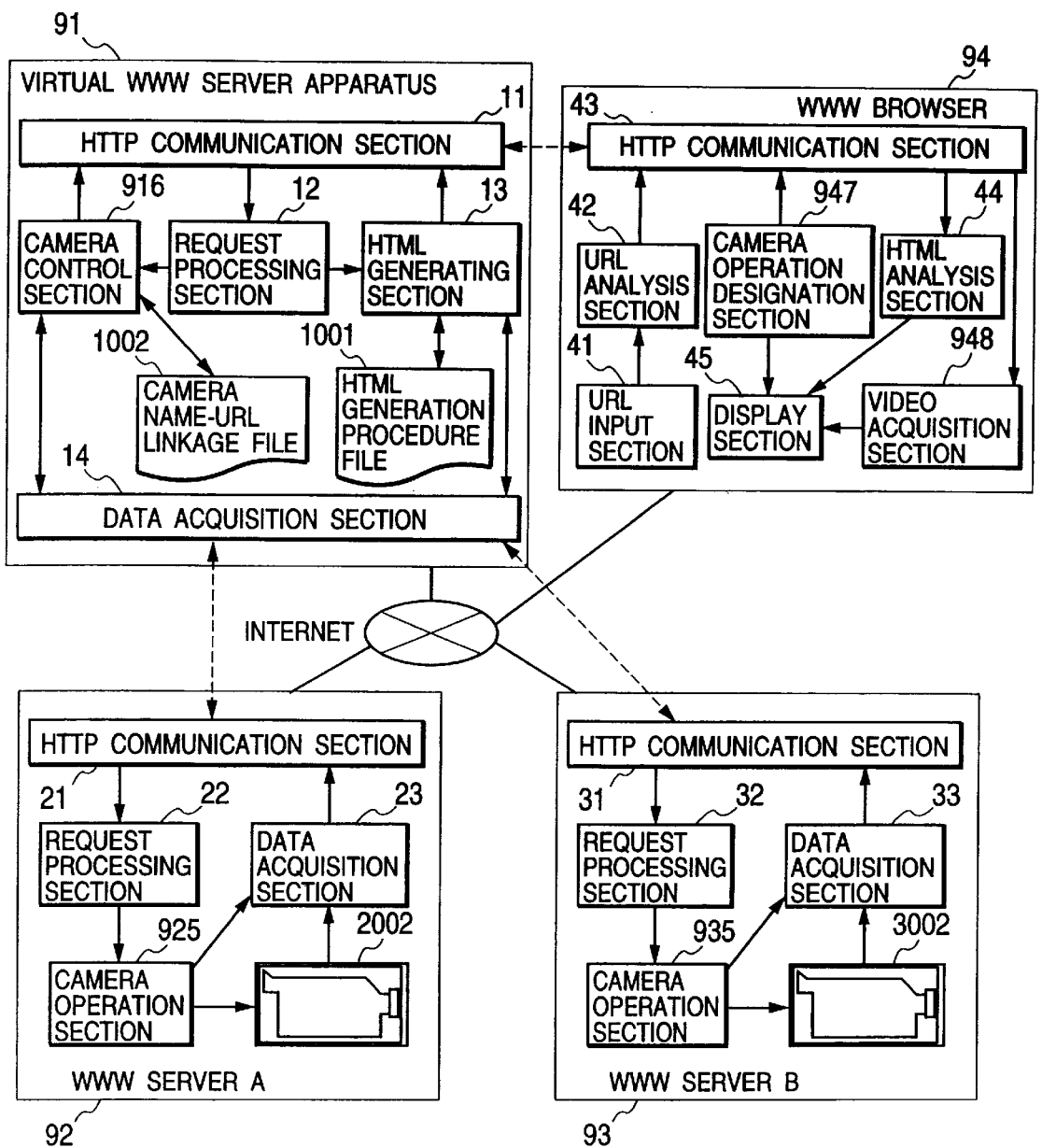
FIG. 9 is a general system block diagram showing a third embodiment of a virtual WWW server apparatus coupled for data communication via the Internet, to enable respective video images from video data produced by a plurality of video cameras controlled by respective WWW servers to be displayed together on a single display screen of a WWW browser, and to enable control of operation of the respective video cameras to be executed by using that single display screen.

In the prior art, it has been necessary to use a separate plug-in for each embedded picture which is to be displayed. Thus when it is required to receive video data from a plurality of WWW servers, it is accordingly necessary to activate a plurality of plug-ins concurrently, and this imposes a substantial load upon the browser resources. However with the third embodiment of the present invention, it becomes possible to concurrently receive video data from a plurality of WWW servers by using a single plug-in, and display the resultant video images on a single display screen, With this embodiment, shown in FIG. 9, a plurality of WWW servers can transfer live video data from respective video cameras (or previously recorded video data) via the Internet, and a WWW browser can enabled to receive and handle all of the streams of video data from the WWW servers and generate respective displayed video images, by using a single plug-in. Numeral 91 denotes a virtual WWW server apparatus for enabling such a capability, while numerals 92, 93 respectively denote first and second WWW servers, assigned the names wwwA and wwwB respectively, each of which can transmit video data via the Internet, generated by respective video cameras which have been assigned predetermined camera names. Numeral 94 denotes a WWW browser which is capable of receiving these video data. The virtual WWW server apparatus 91 includes a camera control section 916 for receiving respective streams of video data produced by the video cameras and acquired via respective Internet connections from the corresponding WWW servers, for multiplexing these video data streams, and sending the resultant multiplexed video data to the HTTP communication section 11 to be transferred via the Internet to the WWW browser 94. The camera control section 916 also serves to receive video camera control operating commands sent from the WWW browser 94, and transfer these operating commands via respective Internet connections to the appropriate ones of the WWW servers. The virtual WWW server apparatus 91 further includes a stored camera name-URL linkage file which relates respective video camera names to corresponding URLs that can can be utilized to send operating commands for controlling the respective video cameras, thereby eliminating the need for the WWW browser to be aware of the respective URLs corresponding to the video camera names when it relays such operating commands from the WWW browser 94 to the video cameras. A request processing section 12 of the virtual WWW server apparatus 91 can discriminate between received file transfer requests and received operating commands, in the same way as described for the request processing section 12 of FIG. 5.

The WWW server A 92 includes a data acquisition section 23 for acquiring video data from a video camera 2002, and a camera operation section 925 for controlling the starting and stopping of acquisition of video data from the video camera 2002. The WWW server B 93 similarly includes a data acquisition section 33, a camera operation section 935 and a video camera 3002.

In addition to the usual browser features, the WWW browser 94 includes a camera operation designation section 947 which is controlled by the activated plug-in such as to enable the user to utilize the display section 45 to input operating commands (i.e., by clicking on corresponding icons) for controlling each of the video cameras, which might for example include commands for activating the cameras, panning the cameras in a desired direction, etc. The WWW browser 94 further includes a video acquisition section 948 which functions, when the plug-in has been activated, to receive from the HTTP communication section 43 video data which have been sent from the virtual WWW server apparatus 91, to demultiplex the respective streams of video data derived from the video cameras 2002 and 3002, and convert the video data to a form in which it can be displayed by that browser. The remaining configuration of this embodiment is identical to that of the prior art example or the first embodiment of the present invention.

Figure 12:
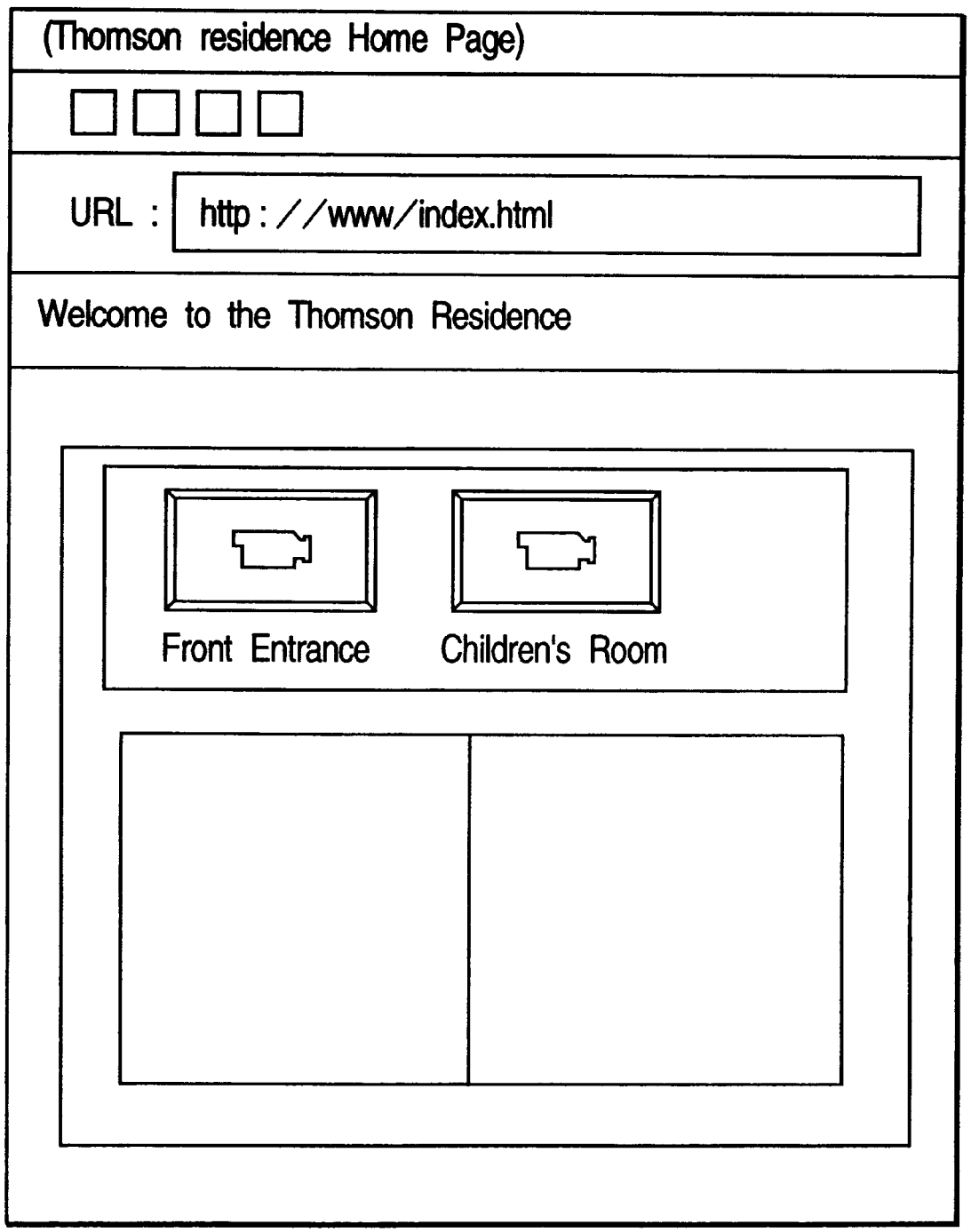
FIG. 12 shows an example of a display picture which would be generated by a WWW browser which has activated a specific plug-in program in response to information contained in the generated HTML file supplied from the virtual WWW server apparatus, before the WWW browser user has input a request to receive video data from video cameras which are identified in the display picture.

In the same way as for the first embodiment of the present invention, when the user of the WWW browser 94 inputs the URL of the HTML generating procedure file 1001, the contents of that file are read out by the HTML data generating section 13. It will be assumed that the contents of the HTML generating procedure file 1001 of this embodiment are as shown in FIG. 10, with the EMBED tag being used to specify embedded picture information. Since in this example the HTML generating procedure file 1001 does not contain any URL tags, the contents of that HTML file are sent directly to the HTTP communication section 43 of the WWW browser 94 from the HTTP communication section 11 of the virtual WWW server apparatus 91 via the Internet, to be analyzed by the HTML analysis section 44. When the HTML analysis section 44 finds the EMBED tag in that received file, with the SRC attribute of that tag specifying a particular video data source (i.e., a location to which a command can be sent for controlling the acquisition of video data) as a URL, it activates a plug-in which has been predetermined as corresponding to these EMBED tag contents. FIG. 12 shows an example of the display picture which appears at the WWW browser 94 after this plug-in has been activated. It will be assumed that the two video cameras 2002, 3002 are provided at a house, i.e., located at the front entrance and in the childrens' room respectively, with these video cameras having been assigned the names "camera1" and "camera2", and with corresponding video camera ON/OFF control icons which are displayed by the display section 45 being designated by numerals 950, 951 in FIG. 12. When the user clicks on the house entrance video camera icon 950, the camera operation designation section 947 detects this and responds by generating a GET command which specifies starting of acquiring video data from the output signal of the video camera having the name "camera1". When that command is generated, a field "/command/" is inserted as the header field of the command, so that the command will be recognized as an operation request by the virtual WWW server apparatus 91. Hence the GET command will take the form:

GET/command/camera1.vew

That GET command is transferred by the HTTP communication section 43 and the HTTP communication section 11 via the Internet to the virtual WWW server apparatus 91, and when the request processing section 12 receives the command it recognizes this as being a video camera operation command, and passes the command to the camera control section 916. The camera control section 916 then reads out the camera name-URL linkage file, and uses the file contents and the specified video camera name (camera1) which is contained in the received GET command to obtain the URL corresponding to that video camera.

FIG. 11 shows an example of the contents of the camera name-URL linkage file. This file links each video camera name to a corresponding URL, so that for example the URL of camera1 (i.e. the URL which is to be used for sending operating commands to the corresponding video camera) can be obtained as "HTTP://wwwA/camera1". From that URL, the name of the WWW server to which connection is to be established can be obtained, and a command for requesting acquisition of video data from the output signal of video camera 2002 of the WWW server A 92 is thereby generated by the camera control section 916 as "GET/camera.vew". That command, and the obtained WWW server name "wwwA" are then passed to the data acquisition section 14. A connection is then established to the WWW server A 92 by the data acquisition section 14, and that GET command is sent via the HTTP communication section 21 of the WWW server A 92 to the request processing section 22. The request processing section 22 responds to this command by notifying the camera operation section 925 to execute a control operation for initiating the supplying of an output video signal signal from the video camera 2002 to the data acquisition section 23, and by notifying the data acquisition section 23 to begin to acquire video data from the video signal and to transfer the video data to the HTTP communication section 21. The video data are thereby transferred via the Internet connection and the data acquisition section 14 to the camera control section 916 of the virtual WWW server apparatus 91. The camera control section 916 passes the video data to the HTTP communication section 11, after assigning to the data the type "CONTENTS". The HTTP communication section 11 then transfers the resultant video data to the HTTP communication section 43 of the WWW browser 94. The HTTP communication section 43 passes the video data to the video acquisition section 948, which converts the received video data into a form which can be displayed by that browser, and the resultant converted video data are supplied to the display section 45, with a corresponding video image being then displayed.

Figure 13:
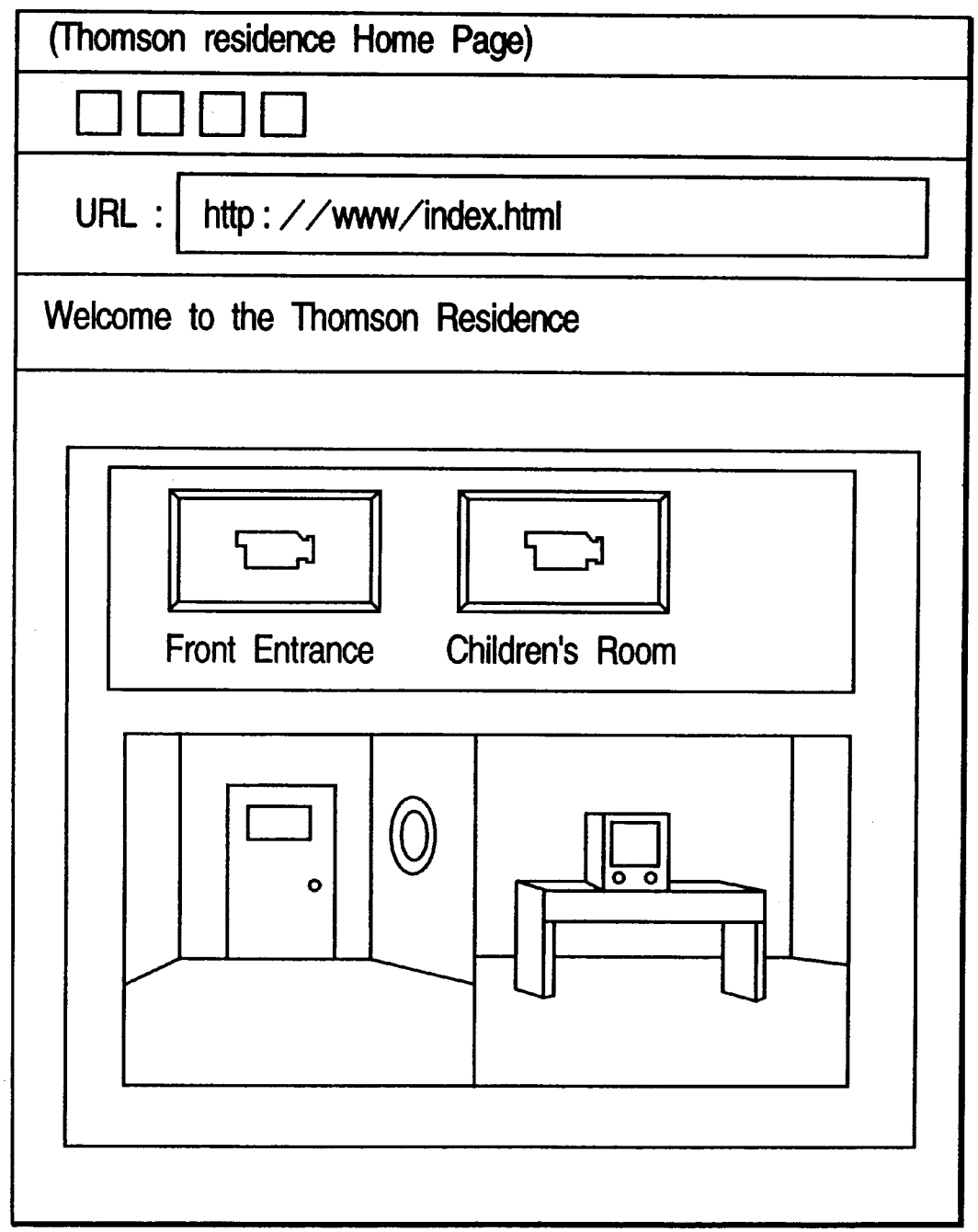
FIG. 13 is an example corresponding to that of FIG. 12, after the WWW browser user has input requests to receive video data from each of the video cameras.

In a similar manner, if the childrens' room is selected, then a video image from the video camera 3002 of the WWW server B 93 will be displayed by the WWW browser 94. FIG. 13 shows an example of two such video images being displayed. When such concurrent display of two video images is executed, the aforementioned multiplexing and demultiplexing operations are performed on the video data derived from the video cameras 2002, 3002.

Figure 22:
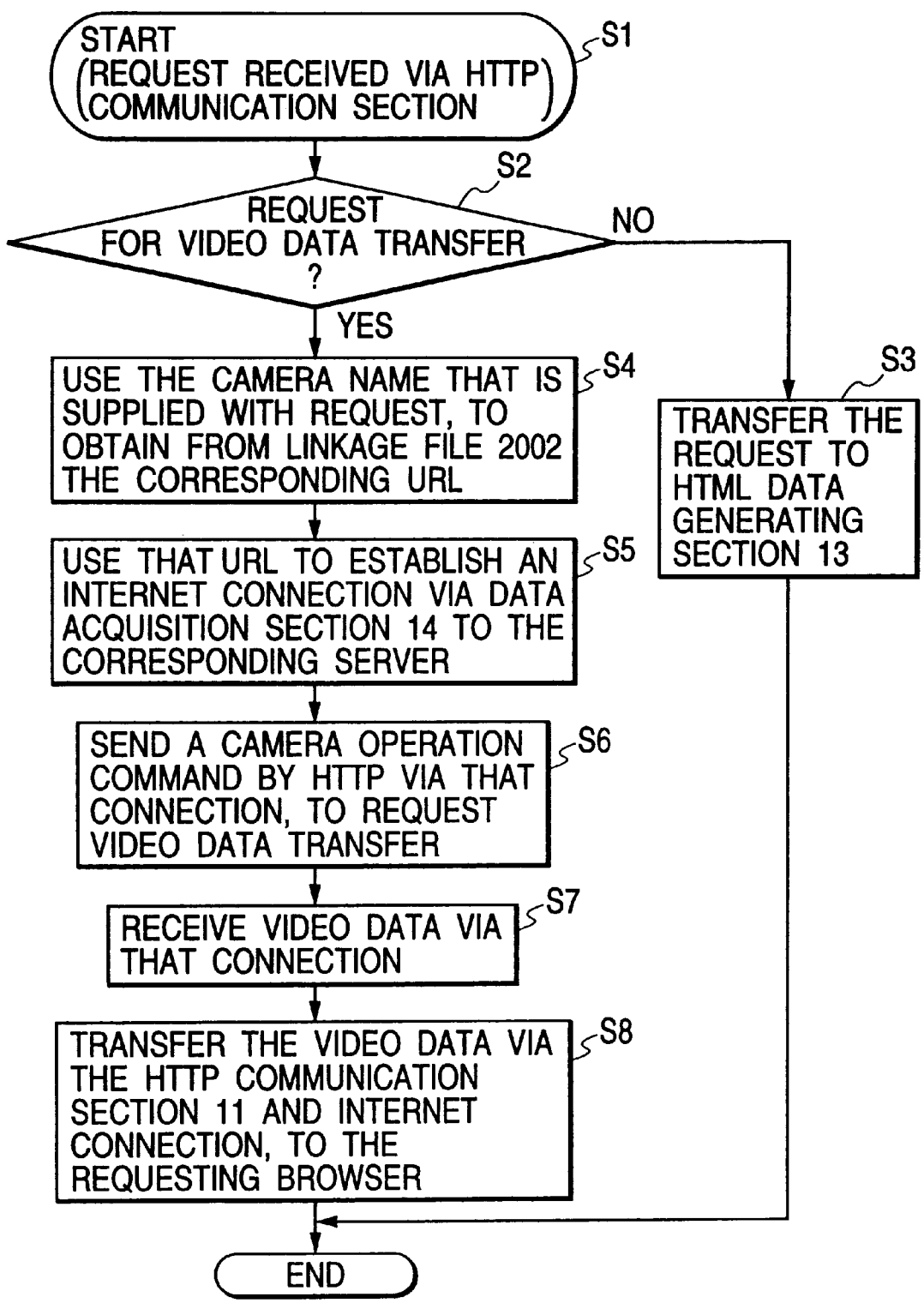
FIG. 22 is a flow diagram illustrating the operation of a camera control section in the third virtual WWW server apparatus embodiment, shown in FIG. 9.

The successive operations executed by the request processing section 12 and camera control section 916 of this embodiment are shown in the flow diagram of FIG. 22.

In addition to such a basic control operation of switching on a video camera to receive video data thereby, this embodiment can easily be modified to enable other forms of camera control to be performed by the user of the WWW browser 94, by generating suitable commands in a similar manner to that described above. For example, it can be predetermined that an "lpan" command for a camera is a pan head control command, which produces panning of a specified video camera to the left. That is, such panning control can be performed for the video camera 2002, which is assigned the name "camera1", by causing the browser to send to the virtual WWW server apparatus 91 the command:

GET/command/camera1.lpan

The virtual WWW server apparatus 91 is thereby notified that pan head control is to be applied to the the video camera 2002 such as to pan that camera to the left. That is to say, the command will be transferred to the camera control section 916 of the virtual WWW server apparatus 91 to the camera control section 916, with the URL corresponding to the video camera 2002 then being obtained in the same manner as described for the "camera1.vew" command, so that a command "GET/camera1.lpan" is sent to the request processing section 22 of the WWW server A 92. The request processing section 22 responds by directing the camera operation section 925 to execute control operations for panning the video camera 2002 to the left.

The plug-in that is activated in response to the EMBED tag shown in FIG. 10 could be configured to display one or more panning control icons such as arrow symbols beside each of the video camera icons shown in FIG. 12, so that for example the user can click on an arrow icon to thereby cause the camera operation designation section 947 to generate and send to the virtual WWW server apparatus the appropriate camera operation command.

Thus with this embodiment of the present invention, as described above, it becomes possible for a browser to concurrently display respective video images from a plurality of video cameras controlled by respective WWW servers, by using only a single plug-in, rather than having to concurrently operate a plurality of plug-ins. Hence, the load imposed on the browser resources is reduced.

Furthermore, since accessing can be executed by using camera names, if a user must perform manual input to designate a specific video camera rather than selecting a displayed icon, it is made unnecessary for the user to specify a URL for the selected video camera.

Furthermore it will be understood from the above description that this embodiment makes it possible for each of a plurality of video cameras located at respectively different WWW servers to be controlled from a WWW browser by using a single display screen, since various types of commands for separately controlling the operation of each of the video cameras can be input by a user, for example by utilizing icons which are generated by the plug-in on that single display screen.

It will be further understood that this embodiment makes it possible to provide a command for use in confirming the connection status of all of the video cameras of the system. Such a command can be configured as a GET command for obtaining video data, which is directed to all of the video cameras, and which is automatically executed immediately after the plug-in is activated. In that case, if all of the video cameras are correctly connected, then all of the corresponding video images will be displayed.

Although this embodiment has been described for the case of live video data being transferred from video cameras, similar effects can of course be obtained for the case of accessing recorded video data.

Fourth Embodiment

By using the third embodiment of the present invention to arrange that video data from a plurality of WWW servers can be displayed on a single display screen of a WWW browser, it becomes possible for a group of individuals to easily configure a simple interactive TV system. That is to say, a computer system such as the computer system A of FIG. 14 which provides both WWW browser and WWW server functions can be installed at the respective homes of these individuals, with each computer system connected to the Internet. However since all of the WWW browsers of these individuals may not be continuously in operation, there would be occasions with such a system when it would not be possible to begin interaction with another user, if the user's WWW browser is not currently activated. With the fourth embodiment of the present invention which is described in the following, if such an interactive TV system has been set up, and if a first one of the users of that system inputs to his or her WWW browser a request for acquiring acquire video data from the video camera at the home of a second one of the users, whose WWW browser is not currently in operation, then:

(a) acquisition of the requested video data, provided by the WWW server of the second user, will be started as described for the third embodiment of the present invention, while in addition (b) the WWW browser of the second user will be automatically activated, while in addition, video data from the video camera of the first user will be transferred and displayed by the WWW browser of the second user.

In the description of this and subsequent embodiments, it should be understood that although only the transfer of video data is described, transfer of accompanying audio data (which is of course necessary in a practical interactive TV system) is also performed in a similar manner, however details are omitted, for brevity of description.

Figure 14:
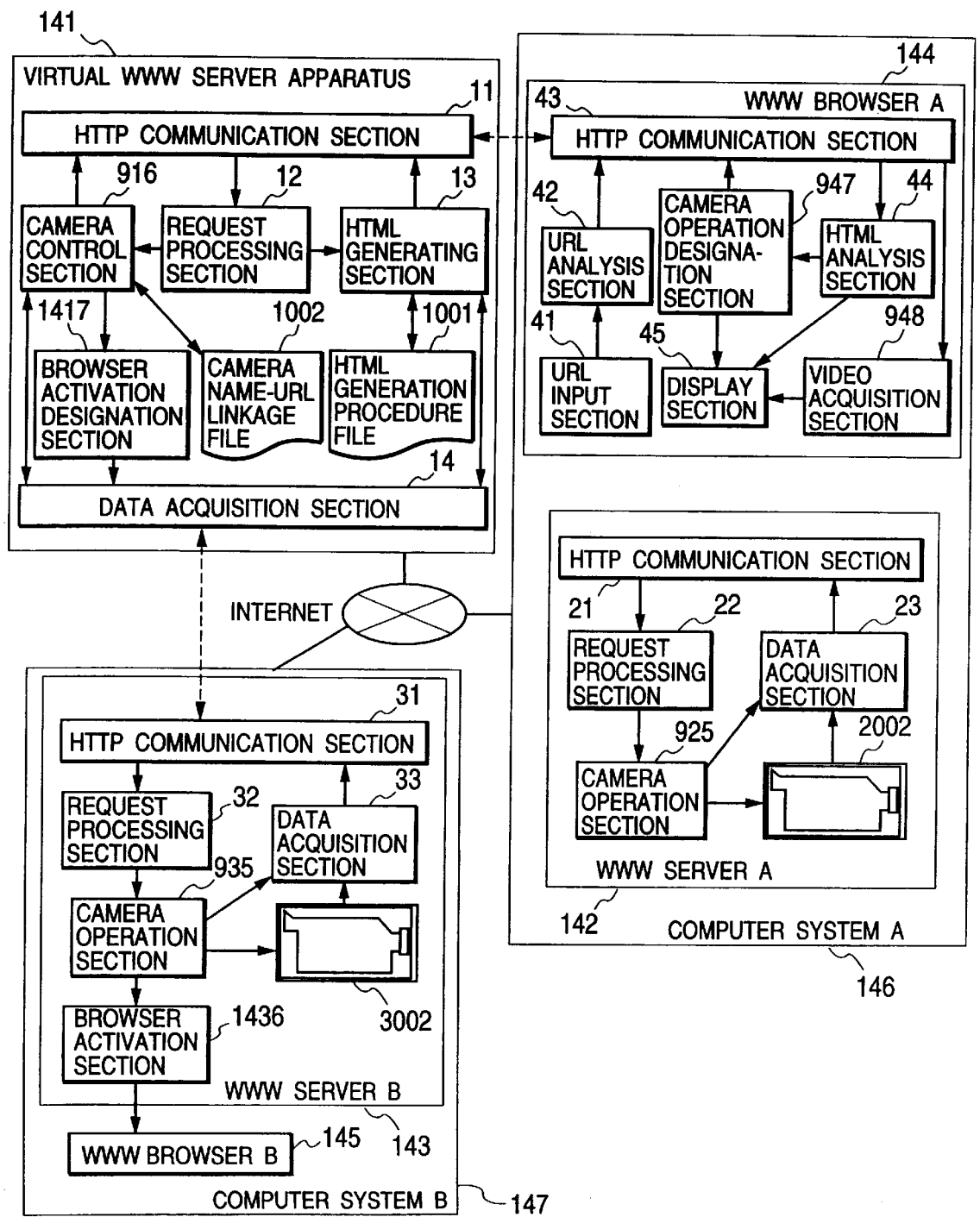
FIG. 14 is a general system block diagram showing a fourth embodiment of a virtual WWW server apparatus coupled for data communication via the Internet, to enable interactive TV communication between respective users of a predetermined plurality of computers each having a WWW server and a WWW browser, whereby a first user is enabled to activate the WWW browser of a second user in order to initiate interactive TV communication.

FIG. 14 shows the system configuration of the fourth embodiment, for implementing such automatic browser activation. In FIG. 14, a computer system A includes a WWW browser A and a WWW server A 142, while a computer system B includes a WWW server B 143 and a WWW browser B 145. The configuration of the WWW browser B 145 is identical to that of the WWW browser A. The WWW server A includes, in addition to the components of the virtual WWW server apparatus 91 of the third embodiment described above, a browser activation designation section 1417 for designating activation of a browser. The WWW server B 143 of the computer system B includes a browser activation section 1436 for executing automatic activation of the WWW browser B 145 of that computer system B. The remaining parts of this embodiment are identical to those of the third embodiment of the present invention described above.

Initially, in the same way as for the third embodiment of the present invention, the user of the WWW browser A inputs the URL of the HTML generating procedure file 1001 of the WWW server A, to thereby transfer to the WWW browser the generated HTML file containing the aforementioned picture embedding information, with the corresponding plug-in being thereby activated by the WWW browser 144, whereby a display picture that can be basically similar to that shown in FIG. 13 will be displayed by the display section 45. In that condition, the user can input a request to begin acquisition of video data from the output signal of the video camera 3002 of the WWW server B 143, e.g. by clicking on a corresponding icon representing that video camera, which is being displayed by the display section 45 through the operation of the plug-in. Assuming that the video camera 3002 has been assigned the camera name "camera2", a corresponding GET command will thereby be generated by the HTTP communication section 43 of the WWW browser A as:

GET/command/camera2.vew.

An Internet connection will thereby be established between the HTTP communication section 43 and the HTTP communication section 11 of the WWW server A. When such a command is received, the receiving server will also obtain the IP address of the computer to which a connection has been set up. In this case, the HTTP communication section 11 obtains the IP address of the computer system A and passes that address together with the above GET command to the request processing section 12. Since this is a video camera control command, the request processing section 12 passes that command together with the IP address of the computer system A to the camera control section 916. The camera control section 916 then establishes an Internet connection via the data acquisition section 14 to the WWW server B 143, to send a command via the HTTP communication section 31 and request processing section 32 to the camera operation section 935 of the WWW server B 143 for acquisition of video data from the video camera 3002. The video data then begins to be sent back via that connection to the camera control section 916, in the same way as described for the third embodiment above. The camera control section 916 transfers the received video data to the HTTP communication section 11, and also passes the name (wwwB) of the WWW server B 143 and the IP address of the computer system A to the browser activation designation section 1417.

The browser activation designation section 1417 obtains from the IP address of the computer system A the corresponding WWW server name (i.e. wwwA), and uses that name as a key for obtaining the name (camera1) of the video camera which is located at the wwwA server 142, by referring to the contents of the camera name-URL linkage file. The obtained name is that assigned to the camera whose video data are to be displayed by the WWW browser B 145 when the WWW browser B 145 is automatically activated. The browser activation designation section 1417 then generates a browser activation command as a GET command utilizing that camera name (such as "GET/command/camera1.autoexec"), and passes the server name (wwwB) of the WWW server B 143 together with that GET command to the data acquisition section 14, for transfer to the WWW server B 143 via the Internet and the HTTP communication section 31.

When the browser activation command is received by the WWW server B 143, it is supplied by the request processing section 32 to the camera operation section 935. The camera operation section 935 sends a request for browser activation together with the camera name (camera1) which is contained in the browser activation command, to the browser activation section 1436. The browser activation section 1436 then activates the WWW browser B 145 by generating a command which also specifies that when the WWW browser 145 is activated it will immediately generate a data transfer request for the HTML generating procedure file 1001 of the virtual WWW server apparatus 141, so that an Internet connection will thereby be established to the the WWW server A, in order to acquire the generated HTML file that is produced by the HTML data generating section 13. If for example the program which is executed by the computer B to implement the functions of the WWW browser B 145 is named "netscape.exe", the WWW server B 143 could achieve the desired activation and initial operation of the WWW browser B 145 by supplying to the operating system of computer B (specifying the appropriate directory path) a command such as:

"netscape HTTP://www/index.html".

The WWW browser B 145 will thereby be activated and the contents of the HTML file generated by the HTML data generating section 13 acquired by the browser. The contents of that file are then used to acquire and activate the requisite plug-in for use in interactive TV operation, in the same way as described for the WWW browser A, whereupon the display screen of the WWW browser B 145 will display a suitable picture for interactive TV operation. This can be basically similar to that shown in FIG. 12 for the preceding embodiment, i.e. with a plurality of respectively named frames being formed, within which video images from respective ones of the video cameras of the users of the interactive TV system will be displayed.

The plug-in then receives from the browser activation section 1436 the name of the camera whose video image is to be displayed by the WWW browser B 145 at that time, i.e., "camera1", and generates a command for requesting that acquisition of video data from the output of that video camera is to be started. That command is sent from the HTTP communication section of that browser via the network and the HTTP communication section 11 to the camera control section 916 of the WWW server A, which then obtains from the camera name-URL linkage file the URL corresponding to the camera name "camera1", The camera control section 916 thereby sends a command to the camera operation section 925 of the WWW server A 142, via the network and HTTP communication section 21 of that WWW server, for acquisition of video data from the video camera 2002 and transfer of the video data, and supplies the video data received thereby to the WWW browser B 145.

As a result, the video data from the video camera 2002 of the WWW server A 142 will automatically begin to be displayed by the WWW browser B 145, when the WWW browser B 145 is activated by the WWW server B 143.

Figure 23:
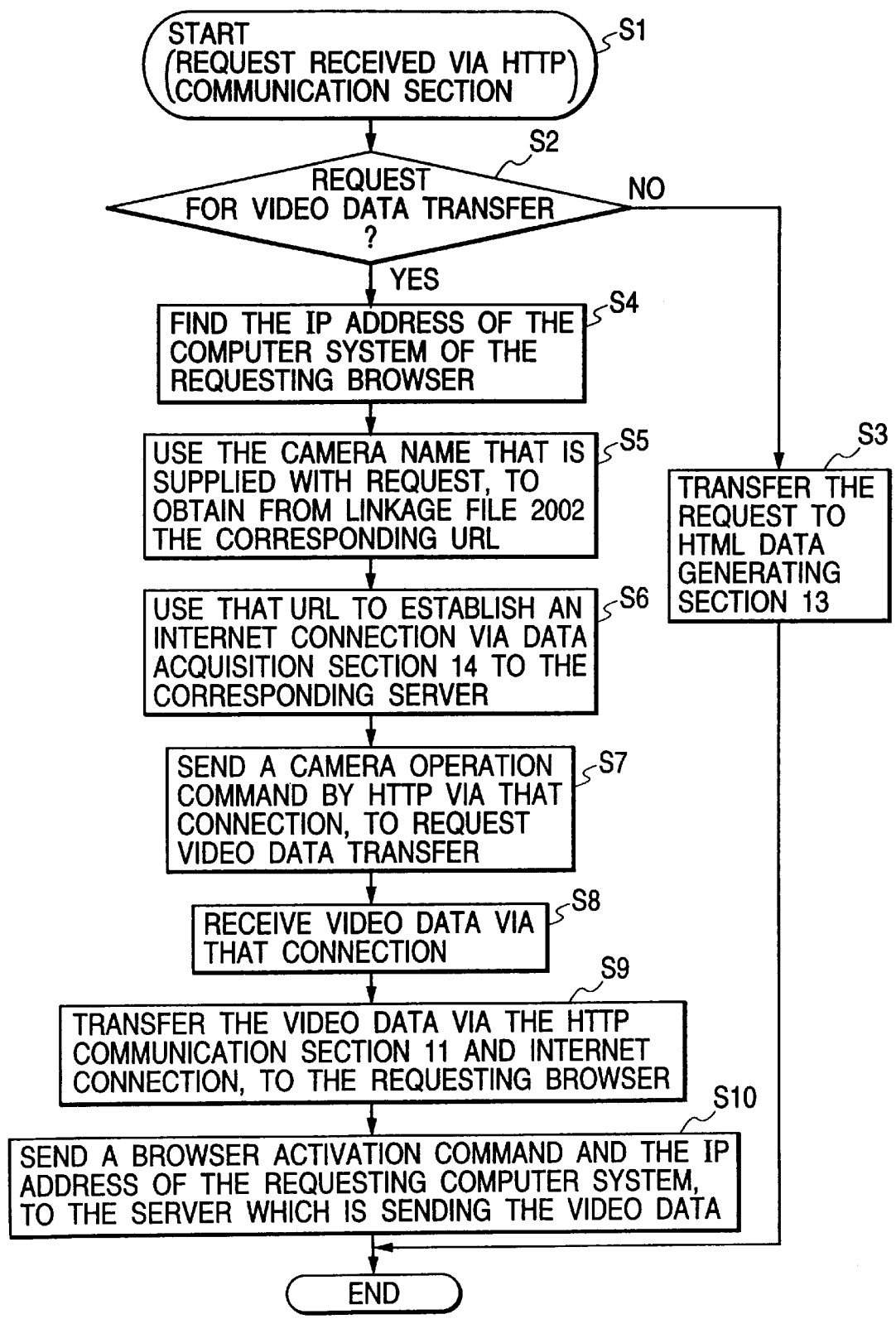
FIG. 23 is a flow diagram illustrating the operation of a camera control section in the fourth virtual WWW server apparatus embodiment, shown in FIG. 14.

The successive operations executed by the request processing section 12 and camera control section 916 of this embodiment are shown in the flow diagram of FIG. 23.

Hence, with this embodiment of the present invention, when a first user inputs to his or her WWW browser a request for acquiring video data from a video camera which is located at the home of a second user, whose WWW browser is not currently activated, the WWW browser at the home of the second user will be automatically activated. In addition, video data from the video camera of the first user will then automatically start to be displayed by the WWW browser at the home of the second user. Thus, such WWW browsers can be utilized to form an interactive TV system without the need for users of the system to perform any special input operations.

To simplify the drawing, the WWW server A 142 of this embodiment is not shown as including a browser activation section. However in practice the system would be configured such that the WWW browser A is automatically activated when the video camera 2002 of the WWW server A 142 is accessed from the WWW browser B 145, in the same way as for the WWW server B 143 and WWW browser B 145.

It should be noted that although the WWW server A is shown as being separate from the computer systems 146 and 147 of this embodiment, it would be possible to implement the functions of the WWW server A on either of these computer systems.

Fifth Embodiment

When a plurality of individuals are executing mutual TV interaction, it is possible that some other individual may desire to join in the interaction which is in progress. However in that case, the video image from the video camera of that individual who wishes to join the interaction will not be displayed to the individuals who are already executing TV interaction. In such a case, it is necessary for the person who wishes to join the interaction to utilize some method of communication with the other individuals, to request that the video data from his or her camera be displayed. However with this embodiment of the present invention, when a user wishing to join a TV interaction which is in progress switches on power to the user's video camera, and activates the requisite plug-in as described previously, the user can then immediately enter that interactive TV session.

Figure 15:
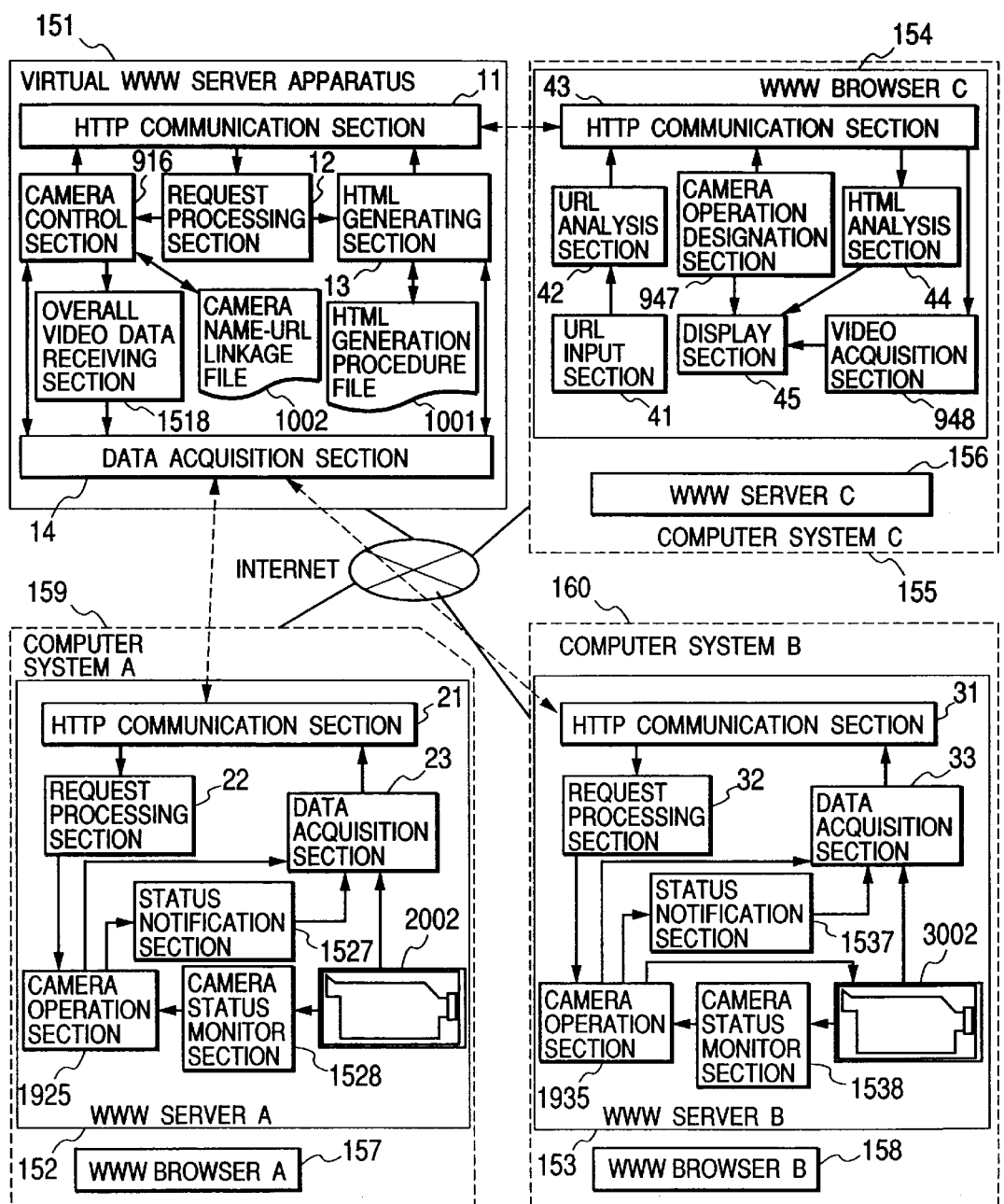
FIG. 15 is a general system block diagram showing a fifth embodiment of a virtual WWW server apparatus coupled for data communication via the Internet, to enable interactive TV communication between respective users of a plurality of computers each having a WWW browser and a WWW server connected to a video camera, whereby when interactive TV communication is initiated between any two of the users, any other user can immediately enter the interaction if desired.

FIG. 15 is a system configuration example for this embodiment. With this example the computer systems of three users, and a virtual WWW server apparatus, are respectively connected to the Internet. This embodiment differs from the third embodiment of the present invention described above in the following respects. A virtual WWW server apparatus 151 includes a overall video data receiving section 1518 for establishing Internet connections to receive video data from all of the video cameras of the interactive TV system.

A WWW server A 152, implemented in a computer system 159 together with a WWW browser 157, includes a camera status monitoring section 1528 for monitoring the power ON/OFF status of the video camera 2002, and for notifying that status to the camera operation section 1925. A status notification section 1527 of the server 152, when requested by the camera operation section 1925, sends a message to the virtual WWW server apparatus 151 notifying that the video camera 2002 is not currently activated. A WWW server B 153 is implemented within a computer system 160 together with a WWW browser 158, and similarly includes a status notification section 1537 and camera status monitoring section 1538 for a video camera 3002.

A WWW browser C 154 is implemented within a computer system C 155, together with a WWW server C 156, with the server configuration being identical to that of servers 152, 153, i.e., with a video camera being controlled by that server.

It will be assumed that the user of the WWW browser C 154 first requests the user of the browser corresponding to the WWW server A 152 to start an interactive TV session, so that the video camera 2002 and the video camera of the WWW server 156 corresponding to the WWW browser C 154 are both activated.

In that condition, if the user of the WWW browser C 154 after activating the appropriate plug-in for TV interaction (i.e. by inputting the URL of the HTML generating procedure file 1001 of the WWW server A, as for the preceding embodiment) inputs a request to receive video data from the video camera 2002 located at the WWW server A 152, then a corresponding GET command which specifies the name "camera1" of the video camera 2002 is generated and transferred via the HTTP communication section 43, the HTTP communication section 11, and the request processing section 12 to the camera control section 916, thereby establishing an Internet connection between the HTTP communication section 11 and HTTP communication section 43. The camera control section 916 then reads out the contents of the camera name-URL linkage file, and uses the received camera name "camera1" to obtain from that file the URL of that video camera (more specifically, the URL for use in sending a camera operating command to the camera operation section 1925 for acquisition of video data) and uses that URL to establish an Internet connection to the WWW server A 152 and to start to obtain video data from the video camera 2002.

At that time, the camera control section 916 also obtains from the camera name-URL linkage file the corresponding URLs for all of the other video cameras of the interactive TV system. Assuming that power is then being supplied to the video camera 3002, the camera status monitoring section 1528 detects that condition and notifies the camera operation section 1925. The camera operation section 1925 accordingly sends a request to the data acquisition section 23, to initiate acquiring and transferring the video data generated by the video camera 2002 via the HTTP communication section 21 and the data acquisition section 14 to the camera control section 916, which passes the received video data to the HTTP communication section 11. The camera control section 916 also passes the URLs of the other video cameras to the overall video data receiving section 1518, to thereby designate transfer of respective streams of video data acquired from all of the video cameras of the interactive TV system to the WWW browser C 154. The overall video data receiving section 1518 then establishes respective connections via the data acquisition section 14 and the Internet to all of the other WWW servers (i.e., in this example to the WWW server B 153) and sends requests to their respective camera control sections for transmission of video camera images. If the video camera of such a WWW server is currently in operation at that time, then the corresponding video data will immediately start to be transferred, via the corresponding connection that has been established through the Internet by the overall video data receiving section 1518, to the camera control section 916.

Thus at that time, if one or more video cameras of the interactive TV system other than the video camera 2002 are currently activated, the camera control section 916 executes multiplexing of the stream of video data from the video camera 2002 which it receives directly from the data acquisition section 14 with the respective streams of video data which are obtained from the other video cameras via the connections established by the overall video data receiving section 1518. The multiplexed stream of video data is transferred by the camera control section 916 via the HTTP communication section 11 and HTTP communication section 43 to the WWW browser C 154, to be demultiplexed and displayed by that browser (under the control of the plug-in) as a set of respective video images from the various video cameras.

However if it is assumed that in this example, power is not being applied to the video camera 3002 when the connection to the WWW server B 153 is established by the overall video data receiving section 1518, then the camera status monitoring section 1538 will notify the camera operation section 1935 of this "camera power OFF" condition, In that case, the camera operation section 1935 responds by sending a request to the status notification section 1537 to notify the virtual WWW server apparatus 151 of this condition. The status notification section 1537 then inputs a message to the data acquisition section 33 (to be transferred to the overall video data receiving section 1518 via the Internet connection that has already been established by the overall video data receiving section 1518 for transferring video data from the video camera 3002) notifying that power has not yet been switched on to the video camera 3002. When the overall video data receiving section 1518 receives that notification, it establishes a waiting condition for the connection via the Internet between the overall video data receiving section 1518 and the WWW server B 153, i.e. with the connection being held unchanged. In that condition, if the user of the WWW browser corresponding to the WWW server B 153 subsequently decides to enter the interactive TV session, the user can simply activate the necessary plug-in (as described above) and switch on power to the video camera 3002. The video data from the video camera 3002 of the WWW server B 153 then begins to be acquired by the data acquisition section 33, received by the overall video data receiving section 1518 via that connection and supplied to the camera control section 916.

That is to say, when the video camera 3002 is switched on, the camera status monitoring section 1538 notifies the camera operation section 1935 of that change in status, whereupon the camera operation section 1935 requests the data acquisition section 33 to begin acquiring video data from the video camera 3002 and sending the video data via the Internet connection that has been held in the waiting condition as described above, to the overall video data receiving section 1518, and hence to be multiplexed with the video data data flow from the video camera 2002 and sent to the WWW browser C 154, to be displayed by the display section 45.

Hence at this stage, two video images are being displayed by the display section 45 of the WWW browser C 154, from the video camera 2002 and video camera 3002 respectively.

Figure 24:
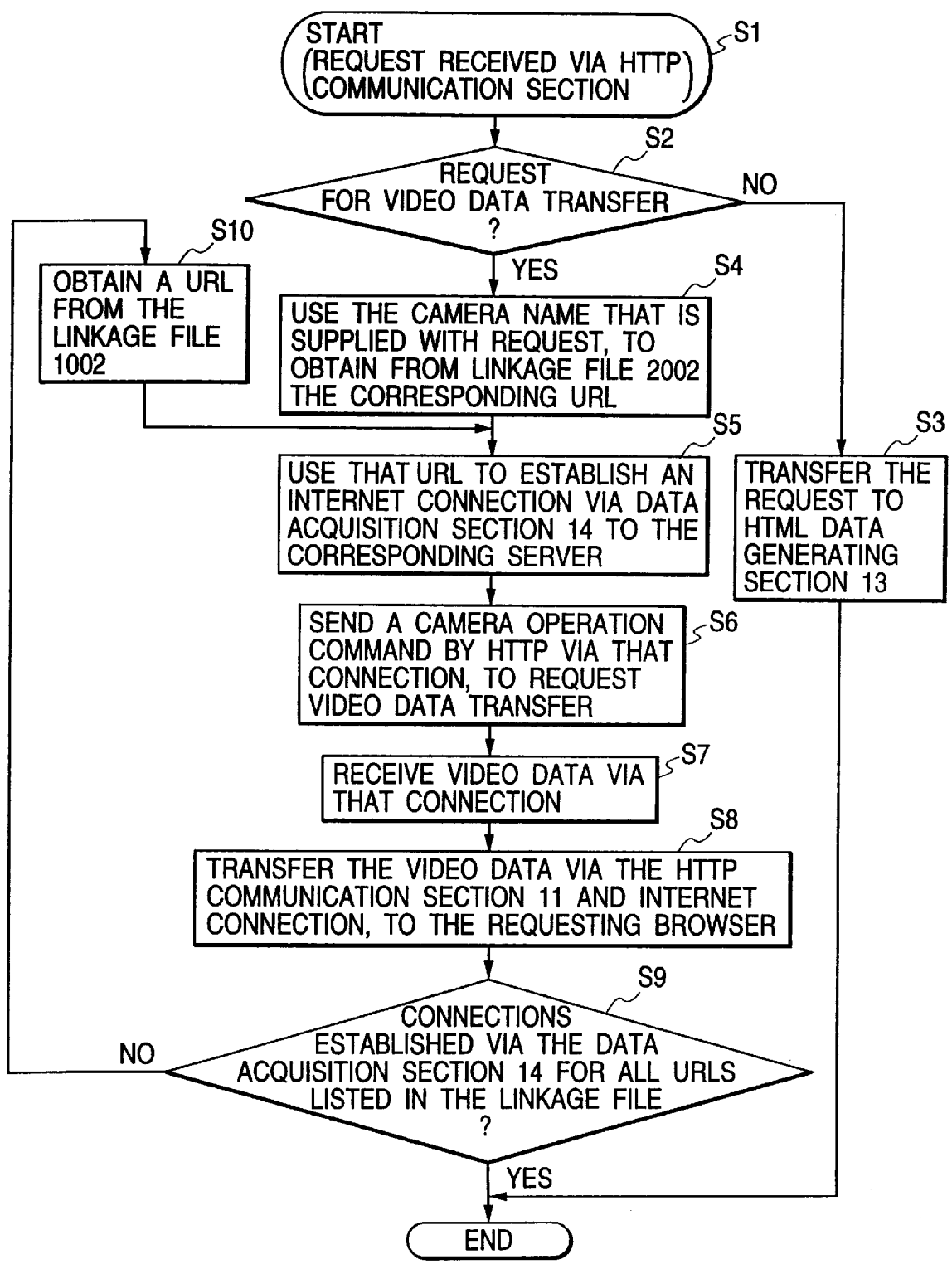
FIG. 24 is a flow diagram illustrating the operation of a camera control section in the fifth virtual WWW server apparatus embodiment, shown in FIG. 15.

The successive operations executed by the request processing section 12 and camera control section 916 of this embodiment are shown in the flow diagram of FIG. 24.

It can thus be understood that with this embodiment, once an interactive TV session has been initiated between two or more users, any other user can immediately start to participate in the session by switching on power to the corresponding video camera and performing a simple input operation.

It is possible that while the aforementioned waiting state of an Internet connection has been established by the overall video data receiving section 1518, the connection may be broken. For example if a firewall is established between the virtual WWW server apparatus 151 and the WWW server B 153, then if transmission/reception of data between these via an Internet connection is halted for longer than a predetermined interval, the connection between these will be automatically broken. In such a case, the camera control section 916 recognizes that the condition of having Internet connections established to all of the servers of the interactive TV system no longer exists. The camera control section 916 then again reads out the camera name-URL linkage file, to obtain the URLs of the various video cameras, and supplies these to the overall video data receiving section 1518 which thereby uses the requisite URL to re-establish the connection which has been broken.

It can thus be understood that this embodiment is applicable to interaction between computer systems which utilize firewall protection.

As can be understood from the above, with the present invention the following results are achieved. Firstly, the invention enables concurrent display of the contents of a plurality of files acquired from respective WWW servers via a network such as the Internet and enables and operating commands to be issued based on the displayed file contents, by using a single display screen, using prior art types of WWW servers and browsers and without the need to alter the HTTP communication method.

Secondly, when one or more of the files acquired from the plurality of WWW servers is a HTML FORM file, it is made possible to send responses to the contents of the FORM files to the respective WWW servers which originated these files, using the single display screen.

Thirdly, it becomes possible for a WWW browser to display video data from a plurality of video cameras controlled by respective WWW servers, for a purpose such as remote monitoring, by using a single plug-in, so that the load on the browser is reduced by comparison with prior art arrangements for implementing such a system.

Fourthly, it becomes possible to easily implement a simple interactive TV system in which a first user can cause automatic activation of the WWW browser of a second user by the action of sending to the WWW server of the second user a request for acquisition of video data from the video camera of the second user, while at the same time causing video data from the video camera of the first user to be displayed by the newly activated WWW browser, thereby notifying the second user to begin the interaction.

Fifthly, it becomes possible it becomes possible to easily implement a simple interactive TV system in which a user can immediately enter into an interaction which is currently in progress between two or more other users, by the action of the first user switching on power to a video camera, with video data from that camera being thereby immediately displayed by the WWW browsers of the other users. Hence it becomes possible for a user to easily join an interaction which is in progress, without performing any special types of operation.

It should be noted that the scope of the present invention is not limited to the contents of the embodiments described above. In particular, rather than providing only a single HTML generating procedure file at the virtual WWW server apparatus, it would be possible to provide a plurality of such HTML generating procedure files, having respectively different URLs. In that case, the virtual WWW server apparatus could for example be used to implement a plurality of remote monitoring systems, etc., each of which could be accessed from a WWW browser by inputting the URL of the appropriate HTML generating procedure file.

Also, in the described embodiments, a predetermined camera name is assumed to be utilized when a request is sent from a browser for acquisition of video data derived from the output of a video camera that is controlled by a server. However if it is known that only a single video camera will be provided at each server, then it would be possible to omit the use of camera names and to identify only the appropriate server, when such a request is sent.

Furthermore it would be possible to combine certain features of a described embodiment, such as the automatic browser activation function of the fourth embodiment, with those of other embodiments.

What is claimed is:

1. In a data communication system having at least one WWW (World Wide Web) browser which is connected via a data communication network to a plurality of WWW servers and includes HTML (HyperText Markup Language) analysis means (44) and display means (45) functioning in combination to display the content of a HTML file, a virtual WWW server apparatus comprising:

HTTP (HyperText Transfer Protocol) communication means (11) for executing communication between the virtual WWW server apparatus and the WWW browser via said network, a stored HTML generating procedure file (1001) containing at least procedure information for use in generating a HTML file, request processing means (12) for receiving requests sent from said WWW browser via said HTTP communication means (11) and for detecting when a file transfer request which specifies said HTML generating procedure file is received, data acquisition means (14) for executing HTTP communication and data acquisition with other ones of said plurality of WWW servers via said network, and HTML generating means (13) for responding to said detection by said request processing means (12) of a file transfer request by reading out said HTML generating procedure file and utilizing said procedure information to supply information to said data acquisition means for use in obtaining, via said network, respective HTML files from a plurality of said WWW servers, operating on the HTML files thereby obtained to produce a generated HTML file which includes respective contents of said obtained HTML files, and supplying said generated HTML file to said HTTP communication means (11) to be transferred to said WWW browser via said network, for thereby concurrently displaying by said display means said respective contents of said obtained HTML files.

2. The virtual WWW server apparatus according to claim 1, wherein said HTML generating procedure file (1001) includes information expressing respective locations of a predetermined plurality of HTML files which are held at respective ones of said plurality of WWW servers, and wherein said HTML generating means (13) comprises means for analyzing said HTML file contents to obtain said location information, successively supplying said location information for said plurality of HTML files to said data acquisition means (14) to thereby obtain said HTML files from said WWW servers by HTTP transfer via said network, and combining respective contents of said HTML files with said procedure information from said HTML generating procedure file (1001) to produce said generated HTML file.

3. The virtual WWW server apparatus according to claim 2, wherein said request processing section (12) includes means for detecting that a set of information sent in response to a FORM HTML file has been received by said HTTP communication means (11) from said WWW browser, and said HTML generating means (13) comprises means for analyzing each of said plurality of HTML files to detect the presence of FORM HTML files, attaching to FORM information contained in a detected FORM HTML file an identifier indicative of a one of said plurality of actual WWW servers which originated said FORM HTML file, combining respective contents of said HTML files with said procedure information contained in said HTML generating procedure file to produce said generated HTML file, and supplying said generated HTML file to said HTTP communication means (11) to be transferred to said WWW browser via said network, and wherein said virtual WWW server apparatus further comprises interface processing means (515) for receiving each said set of information sent from said WWW browser in response to a FORM HTML file and detected by said request processing means (12), and for using said identifier to control said data acquisition means (14) to send said set of information to said originating one of the plurality of WWW servers, by HTTP via said network.

4. The virtual WWW server apparatus according to claim 1, wherein each of said plurality of WWW servers includes a video camera identified by a corresponding name and video camera operation means for controlling the supplying of video data generated by said video camera to said network, and wherein said HTML generating procedure file (1001) includes picture embedding information for causing said WWW browser to activate a plug-in program for controlling said WWW browser to selectively display a plurality of video images from respective ones of said video cameras in response to respective input requests which specify said video camera names, with said picture embedding information identifying said virtual WWW server apparatus as a single source of video data for use in generating each of said video images, said HTML generating means (13) comprises means for using said HTML generating procedure file contents to produce a generated HTML file containing said picture embedding information, and supplying said generated HTML file to said HTTP communication means to be transferred to said WWW browser via said network, and said request processing means (12) comprises means for detecting that a video data transfer request which specifies one of said video camera names has been received by said HTTP communication means (11) from said WWW browser, and wherein said virtual WWW server apparatus further comprises a linkage file (1002) containing information relating respective video camera names to corresponding locations of said video camera operation means of said WWW servers, and camera control means (916) for receiving from said request processing means (12) a video camera name which is received with a request for video data transfer, reading out the contents of said linkage file (1002) to obtain a location of said video camera operation means corresponding to said video camera name, sending to said video camera operation means (925) via said data acquisition means (14) and said network a request for transfer of video data from a video camera corresponding to said video camera name, and transferring said video data from said data acquisition means (14) to said HTTP communication means (11), to be transferred via said network to said WWW browser.

5. In a data communication system having at least one WWW (World Wide Web) browser which is connected via a data communication network to a plurality of WWW servers, a virtual WWW server apparatus comprising HTTP (HyperText Transfer Protocol) communication means (11) for executing communication between the virtual WWW server apparatus and the WWW browser via said network, a stored HTML generating procedure file (1001) containing procedure information for use in generating a HTML (HyperText Markup Language) file and also containing information expressing respective locations of a predetermined set of HTML files held at respective ones of said WWW servers, request processing means (12) for detecting when a file transfer request which specifies said HTML generating procedure file is received by said HTTP communication means (11), data acquisition means (14) for executing HTTP communication with other ones of said plurality of WWW servers via said network, and HTML generating means (13) for responding to said detection by said request processing means of a file transfer request by reading out said HTML generating procedure file to obtain information specifying each of said locations of the predetermined set of HTML files, successively supplying information specifying said locations to said data acquisition means (14) to thereby obtain said HTML files from said WWW servers by HTTP transfer via said network, combining respective contents of said HTML files with said procedure information contained in said HTML generating procedure file (1001) to produce a generated HTML file, and supplying said generated HTML file to said HTTP communication means (11) to be transferred to said WWW browser via said network.

6. The virtual WWW server apparatus according to claim 5, wherein said request processing section (12) includes means for detecting that a set of information sent in response to a FORM HTML file has been received by said HTTP communication means (11) from said WWW browser, and said HTML generating means (13) comprises means for analyzing each of said plurality of HTML files to detect the presence of FORM HTML files, attaching to FORM information contained in a detected FORM HTML file an identifier indicative of a one of said plurality of actual WWW servers which originated said FORM HTML file, combining respective contents of said HTML files with said procedure information contained in said HTML generating procedure file to produce said generated HTML file, and supplying said generated HTML file to said HTTP communication means (11) to be transferred to said WWW browser via said network, and wherein said virtual WWW server apparatus further comprises interface processing means (515) for receiving each said set of information sent from said WWW browser in response to a FORM HTML file and detected by said request processing means (12), and for using said identifier to control said data acquisition means (14) to send said set of information to said originating one of the plurality of WWW servers, by HTTP via said network.

7. In a data communication system having at least one WWW (World Wide Web) browser which is connected via a data communication network to a plurality of WWW servers, a virtual WWW server apparatus comprising HTTP (HyperText Transfer Protocol) communication means (11) for executing communication between the virtual WWW server apparatus and the WWW browser via said network, a stored HTML (HyperText Markup Language) data generating file (1001) containing procedure information for use in generating a HTML file and also containing information expressing respective locations of a predetermined set of HTML files held at respective ones of said actual WWW servers, request processing means (12) for respectively detecting when a file transfer request which specifies said HTML generating procedure file or when a set of information sent in response to a FORM HTML file is received by said HTTP communication means (11), data acquisition means (14) for executing HTTP communication with said predetermined set of actual WWW servers via said network, HTML generating means (13) for responding to said detection by said request processing means of a file transfer request by reading out said HTML generating procedure file (1001) to obtain information specifying each of said locations of the predetermined set of HTML files, successively supplying information specifying said locations to said data acquisition means (14) to thereby obtain said HTML files from said actual WWW servers by HTTP transfer via said network, analyzing each of said obtained HTML files to detect the presence of FORM HTML files, attaching to FORM information contained in each detected FORM HTML file an identifier indicative of a one of said plurality of actual WWW servers which originated said FORM HTML file, combining respective contents of said HTML files with said procedure information contained in said HTML generating procedure file to produce a generated HTML file, and supplying said generated HTML file to said HTTP communication means (11) to be transferred to said WWW browser via said network, and interface processing means (515) for receiving each said set of information sent from said WWW browser in response to a FORM HTML file and detected by said request processing means (12), for using said identifier to control said data acquisition means (14) to send said set of information to said originating one of the plurality of WWW servers, by HTTP via said network.

8. In a data communication system having at least one WWW (World Wide Web) browser which is connected via a data communication network to a plurality of WWW servers which respectively include a video camera and video camera operation means for controlling the supplying of video data generated by said video camera to said network, a virtual WWW server apparatus comprising HTTP (HyperText Transfer Protocol) communication means (11) for executing communication between the virtual WWW server apparatus and the WWW browser via said network, a stored HTML generating procedure file (1001) containing procedure information for use in generating a HTML file and also containing picture embedding information for causing said WWW browser to activate a predetermined plug-in program for controlling said WWW browser to selectively display a plurality of video images from respective ones of said video cameras in response to respective input requests which specify said video camera names, with said picture embedding information identifying said virtual WWW server apparatus as a single source of video data for use in generating each of said video images, a linkage file (1002) containing information relating respective video camera names to corresponding locations of said video camera operation means of said WWW servers, request processing means (12) for respectively detecting when a file transfer request which specifies said HTML generating procedure file or a video data transfer request which specifies one of said video camera names is received by said HTTP communication means (11) from said WWW browser, data acquisition means (14) for executing communication with said plurality of WWW servers via said network, HTML generating means (13) for responding to said detection by said request processing means of a file transfer request by reading out said HTML generating procedure file contents and using said contents to produce a generated HTML file containing said picture embedding information, and supplying said generated HTML file to said HTTP communication means to be transferred to said WWW browser via said network, and camera control means (916) for receiving from said request processing means (12) a video camera name which is received with a request for video data transfer, reading out the contents of said linkage file (1002) to obtain a location of said video camera operation means corresponding to said video camera name, sending to said video camera operation means (925) via said data acquisition means (14) and said network a request for transfer of video data from a video camera corresponding to said video camera name via said network to said data acquisition means (14), and transferring said video data from said data acquisition means (14) to said HTTP communication means (11), to be transferred via said network to said WWW browser.

9. In a data communication system having a data communication network and at least two computer systems each having a WWW (World Wide Web) browser and a WWW server, with the WWW server of each said computer system including browser activation means (1436) operable for activating the corresponding WWW browser, with each of said WWW servers including a video camera (3002) and video camera operation means (935) for controlling the supplying of video data generated by said video camera to said network, a virtual WWW server apparatus comprising HTTP (HyperText Transfer Protocol) communication means (11) for executing communication between the virtual WWW server apparatus and each of said WWW browsers via said network, a stored HTML (HyperText Markup Language) data generating file (1001) containing procedure information for use in generating a HTML file and also containing picture embedding information for causing said WWW browser to activate a predetermined plug-in program for controlling said WWW browser to selectively display a plurality of video images from respective ones of said video cameras in response to respective input requests which specify said video camera names, with said picture embedding information identifying said virtual WWW server apparatus as a single source of video data for use in generating each of said video images, a stored camera name linkage file (1002) containing information relating respective video camera names, to corresponding locations of said video camera operation means of said WWW servers, request processing means (12) for respectively detecting when a file transfer request which specifies said HTML generating procedure file or which specifies a name of a video camera located at the WWW server of a second one of said computer systems is received by said HTTP communication means (11) from a first one of said WWW browsers, data acquisition means (14) for executing communication with said WWW servers via said network, HTML generating means (13) for responding to said detection by said request processing means (12) of a file transfer request from said first one of said WWW browsers by reading out said HTML generating procedure file (1001), using the contents of said HTML generating procedure file to produce a generated HTML file containing said plug-in location information, and supplying said generated HTML file to said HTTP communication means (11) to be transferred to said first WWW browser via said network, camera control means (916) for receiving from said request processing means (12) said video camera name, reading out the contents of said linkage file (1002) to obtain a location of said video camera operation means corresponding to said video camera name, sending to said video camera operation means (935) of the WWW server of said second computer system, via said data acquisition means (14) and said network, a request for transfer of video data from a video camera corresponding to said video camera name via said network to said data acquisition means (14), and transferring said video data from said data acquisition means (14) to said HTTP communication means (11), to be transferred via said network to said first WWW browser, and browser activation designation means (1417) controlled by said camera control means for sending a browser activation request to said browser activation means (1436) of the second computer system via said data acquisition means and said network, said second WWW browser being controlled by said browser activation means (1436) to be activated thereby and to send to said virtual WWW server apparatus a file transfer request specifying said HTML generating procedure file, to thereby obtain from said virtual WWW server apparatus said picture embedding information and to obtain and activate said plug-in program.

10. In a data communication system having a data communication network and a plurality of three or more computer systems each having a WWW (World Wide Web) browser and a WWW server, with the WWW server of each said computer system including a video camera, video camera operation means for controlling the supplying of video data generated by said video camera to said network, means (camera status monitoring section 1538) for monitoring the operation of said video camera and means (1537) controllable for sending via said network a message indicative of an inactive status of said video camera, a virtual WWW server apparatus comprising HTTP (HyperText Transfer Protocol) communication means (11) for executing communication between the virtual WWW server apparatus and each of said WWW browsers via said network, a stored HTML (HyperText Markup Language) data generating file (1001) containing procedure information for use in generating a HTML file and also containing picture embedding information for causing said WWW browser to activate a predetermined plug-in program for controlling said WWW browser to selectively display a plurality of video images from respective ones of said video cameras in response to respective input requests which specify said video camera names, with said picture embedding information identifying said virtual WWW server apparatus as a single source of video data for use in generating said video images, a stored camera name linkage file (1002) containing information relating respective video camera names to corresponding locations of said video camera operation means of said WWW servers, request processing means (12) for respectively detecting when a file transfer request which specifies said HTML generating procedure file or a video data transfer request which specifies a name of a video camera located at the WWW server of a second one of said computer systems is received by said HTTP communication means (11) from a first one of said WWW browsers, data acquisition means (14) for executing communication with said WWW servers via said network, HTML generating means (13) for responding to said detection by said request processing means (12) of a file transfer request from said first one of said WWW browsers by reading out said HTML generating procedure file (1001) contents and using said contents to produce a generated HTML file containing said picture embedding information, and supplying said generated HTML file to said HTTP communication means (11) to be transferred to said first WWW browser via said network, camera control means (916) for receiving from said request processing means (12) said request for video data transfer and said video camera name and, if no interactive communication is currently in progress between any of said computer systems, reading out the contents of said linkage file (1002) to obtain a location of said video camera operation means corresponding to said video camera name, sending to said video camera operation means (1025) of the WWW server of said second computer system, via said data acquisition means (14) and said network, a request for establishment of a connection via said data acquisition means and said network for transfer of video data from a video camera corresponding to said video camera name, and transferring said video data from said data acquisition means (14) to said HTTP communication means (11), to be transferred via said network to said first WWW browser, overall video data receiving means (1518) functioning, if interactive communication is currently in progress between a plurality of said computer systems when said request for video data transfer and said video data name are received, to obtain from said linkage file (1002) the respective locations of said video camera operation means of all of said plurality of computer systems other than said second computer system, and for sending to each of said video camera operation means respective requests for transfer of video data from a corresponding one of said video cameras and establishment of a connection via said network and said data acquisition means (14) for transfer of said video data, wherein said overall video data receiving means (1518) responds to a message from said notification means (1537) of any of said WWW servers indicating that a video camera is currently inactivated, by holding a corresponding connection via said network to said WWW server in an unchanged condition until said video camera is activated and video data therefrom can be transferred to said virtual WWW server apparatus via said connection.

* * * * *